US012784663B2

(12) United States Patent
Kim

(10) Patent No.: US 12,784,663 B2
(45) Date of Patent: Nov. 3, 2026

(54) DISPLAY DEVICE AND ELECTRONIC DEVICE INCLUDING THE SAME

(71) Applicant: SAMSUNG DISPLAY CO., LTD., Yongin-si (KR)

(72) Inventor: Woung Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/225,143

(22) Filed: Jun. 2, 2025

(65) Prior Publication Data

US 2026/0127999 A1 May 7, 2026

(30) Foreign Application Priority Data

Nov. 5, 2024 (KR) ........................ 10-2024-0155524

(51) Int. Cl.

*G09G 3/3233* (2016.01)
*G09G 3/32* (2016.01)
*G09G 3/3266* (2016.01)

(52) U.S. Cl.

CPC ............ *G09G 3/32* (2013.01); *G09G 3/3233* (2013.01); *G09G 3/3266* (2013.01); *G09G 2310/0267* (2013.01); *G09G 2310/08* (2013.01); *G09G 2320/0233* (2013.01); *G09G 2320/0257* (2013.01); *G09G 2330/021* (2013.01); *G09G 2330/028* (2013.01)

(58) Field of Classification Search

CPC ... G09G 3/30–3291; G09G 2300/0819; G09G 2300/0842–0871; G09G 2310/08

See application file for complete search history.

(56) References Cited

U.S. PATENT DOCUMENTS

| | | | | |
|---|---|---|---|---|
| 11,217,149 | B2 | 1/2022 | In et al. | |
| 11,336,879 | B2 | 5/2022 | Kwon | |
| 11,665,943 | B1 * | 5/2023 | Kim | G09G 3/3233 257/40 |
| 11,676,536 | B2 | 6/2023 | Chae et al. | |
| 2021/0027696 | A1 * | 1/2021 | Kim | G09G 3/3233 |
| 2021/0125543 | A1 * | 4/2021 | Kim | G09G 3/3266 |
| 2022/0028329 | A1 * | 1/2022 | Kim | G09G 3/32 |
| 2022/0270542 | A1 * | 8/2022 | Park | G09G 3/32 |
| 2022/0358881 | A1 * | 11/2022 | Chae | G09G 3/3266 |
| 2022/0392382 | A1 | 12/2022 | Park et al. | |
| 2022/0415254 | A1 * | 12/2022 | Jeon | G09G 3/3233 |

(Continued)

FOREIGN PATENT DOCUMENTS

| | | | |
|---|---|---|---|
| KR | 10-2022-0115765 | A | 8/2022 |
| KR | 10-2429559 | B1 | 8/2022 |

(Continued)

*Primary Examiner* — Amy Onyekaba

(74) *Attorney, Agent, or Firm* — F. CHAU & ASSOCIATES, LLC

(57) ABSTRACT

A display device includes a plurality of pixels, each pixel of the plurality of pixels includes a driving transistor, in which the driving transistor receives a data signal and drives a driving current to a light emitting device based on the data signal, a bias transistor which supplies bias power source to the driving transistor, and a scan driver providing a bias scan signal to the bias transistor. The bias scan signal has a first width during a display-scan period and has a second width during a self-scan period, and the second width is different from the first width.

20 Claims, 15 Drawing Sheets

(56) References Cited

U.S. PATENT DOCUMENTS

| | | | | |
|---|---|---|---|---|
| 2023/0051015 | A1* | 2/2023 | Im | G09G 3/3208 |
| 2023/0070352 | A1* | 3/2023 | Hwang | G09G 3/2007 |
| 2023/0075763 | A1* | 3/2023 | Kim | G09G 3/2096 |
| 2023/0075995 | A1* | 3/2023 | Lee | G09G 3/2011 |
| 2023/0112488 | A1* | 4/2023 | Yang | G09G 3/3233<br>345/204 |
| 2023/0154403 | A1* | 5/2023 | Kang | G09G 3/3233<br>345/211 |
| 2023/0178003 | A1* | 6/2023 | Kim | G09G 3/32 |
| 2023/0178027 | A1* | 6/2023 | In | G09G 3/3266 |
| 2025/0372028 | A1* | 12/2025 | Kang | G09G 3/32 |

FOREIGN PATENT DOCUMENTS

| | | | |
|---|---|---|---|
| KR | 10-2022-0152481 | A | 11/2022 |
| KR | 10-2688476 | B1 | 7/2024 |

* cited by examiner

<DSP>

DISPLAY DEVICE AND ELECTRONIC DEVICE INCLUDING THE SAME

CROSS-REFERENCE TO RELATED APPLICATION

This application claims priority under 35 U.S.C. § 119(a) to Korean Patent Application No. 10-2024-0155524, filed on Nov. 5, 2024, in the Korean Intellectual Property Office, the disclosure of which is incorporated by reference herein in its entirety.

TECHNICAL FIELD

Embodiments of the present inventive concept relate to a display device, a method for driving the display device, and an electronic device including the display device. More particularly, the display device improves display quality by reducing luminance variation at different driving conditions.

DISCUSSION OF RELATED ART

Modern display devices are becoming important elements which connect various electrical media to users and provide high-quality video information. The display devices may include a plurality of pixels which emit light with predetermined luminance. Because maintaining stable luminance level at various operating conditions is important for improving display quality of the display devices, pixels may be controlled differently at different driving conditions. The display devices may include a liquid crystal display device, an organic light emitting display device, and an inorganic light emitting display device.

SUMMARY

A display device includes a plurality of pixels, each pixel of the plurality of pixels includes a driving transistor, in which a gate electrode of the driving transistor is electrically connected to a data line and receives a data signal through the data line, a first electrode of the driving transistor is electrically connected to a bias power line and receives a bias power source through the bias power line, and a second electrode of the driving transistor is coupled to an anode electrode of a light emitting device and drives a driving current to the light emitting device, wherein the light emitting device emits light in proportion to amount of the driving current from the driving transistor, and a bias transistor which is turned on in response to a bias scan signal and supplies the bias power source to the first electrode of the driving transistor, and a scan driver generating the bias scan signal and providing the bias scan signal to the bias transistor, the bias scan signal has a first width during a display-scan period and has a second width during a self-scan period, and the second width is different from the first width. The second width is narrower than the first width.

one frame period includes the display-scan period and the self-scan period which immediately follows the display-scan period, and during the display-scan period, pixels receives a data signal and displays an image based on the received data signal, and during the self-scan period following the display-scan period, pixels displays the image based on a stored data signal previously received during the display-scan period.

The one frame period includes two or more self-scan periods, and the scan driver adjusts a width of the bias scan signal from the first width to the second width during the two or more self-scan periods.

The display device further includes a timing controller, and the timing controller includes a start signal generator, and the start signal generator generates a scan start signal and provides the scan start signal to the scan driver for controlling the width of the bias scan signal.

The start signal generator receives driving frequency information and determines a number of the self-scan periods included in the one frame period based on the driving frequency information.

The scan start signal controls the width of the bias scan signal based on a driving frequency, a dimming level, and an average grayscale of the one frame period.

The scan start signal controls for the width of the bias scan signal to be decreased as the driving frequency increases.

The scan start signal controls the width of the bias scan signal to be decreased as the dimming level increases.

The scan start signal controls the width of the bias scan signal to be decreased as the average grayscale increases.

The display device further includes a bias voltage generator generating the bias power source, wherein the bias voltage generator is configured to supply the bias power source through the bias power line, and the bias power source maintains a constant voltage level during the one frame period.

The display device further includes a bias voltage generator generating the bias power source, wherein the bias voltage generator is configured to supply the bias power source having a first voltage to the bias power line during the display-scan period and supply the bias power source having a second voltage to the bias power line during the self-scan period, and the second voltage is lower than the first voltage.

According to an embodiment, a display device includes a plurality of pixels, each pixel of the plurality of pixels includes a driving transistor and a bias transistor, wherein the bias transistor is connected between a first electrode of the driving transistor and a bias power line, and upon receiving a bias scan signal, the bias transistor is turned on and supplies a bias power source to first electrode of the driving transistor, and a bias voltage generator configured to change a voltage of the bias power source in accordance with at least one of a dimming level, an average grayscale of one frame period, or a driving frequency, the one frame period includes a display-scan period and a plurality of self-scan periods which immediately follows the display-scan period, and during the display-scan period, pixels receives a data signal and displays an image based on the received data signal, and during the self-scan period following the display-scan period, pixels displays the image based on a stored data signal previously received during the display-scan period, and the bias voltage generator controls the voltage level of the bias power source during the plurality of self-scan periods to be lower than the voltage level of the bias power source during the display-scan period.

The bias voltage generator controls the voltage level of the bias power source to be lower as the driving frequency increases.

The bias voltage generator controls the voltage level of the bias power source to be lower as the dimming level increases.

The bias voltage generator controls the voltage level of the bias power source to be lower as the average grayscale of the one frame increases.

A method of driving a display device includes supplying a bias scan signal having a first width to a bias transistor of a pixel during a display-scan period, in which a driving transistor of the pixel receives a data signal during the first width of the bias scan signal, and supplying the bias scan signal having a second width to the bias transistor of the pixel during a plurality of self-scan periods, in which a light emitting device of the pixel emits light during the second width of the bias scan signal.

The second width is narrower than the first width.

A width of the bias scan signal is controlled to be decreased from the first width to the second width during stages of the plurality of self-scan periods.

An electronic device according to embodiments of the present inventive concept includes a processor and a display device, the display device includes a plurality of pixels, each pixel of the plurality of pixels including a driving transistor and a bias transistor, wherein the bias transistor is connected between a first electrode of the driving transistor and a bias power line, and upon receiving a bias scan signal, the bias transistor is turned on and supplies a bias power source to first electrode of the driving transistor, and a gate driver supplying the bias scan signal having different widths during the display-scan period and the self-scan period, wherein one frame period includes a display-scan period and a self-scan period during which immediately follows the display-scan period, and during the display-scan period, pixels receives a data signal and displays an image based on the received data signal, and during the self-scan period following the display-scan period, pixels displays the image based on a stored data signal previously received during the display-scan period, and wherein the processor transmits a command to the display device for controlling the gate driver of the display device to supply the bias scan signal having different widths during the display-scan period and the self-scan period.

DETAILED DESCRIPTION OF EMBODIMENTS

Figure 1:
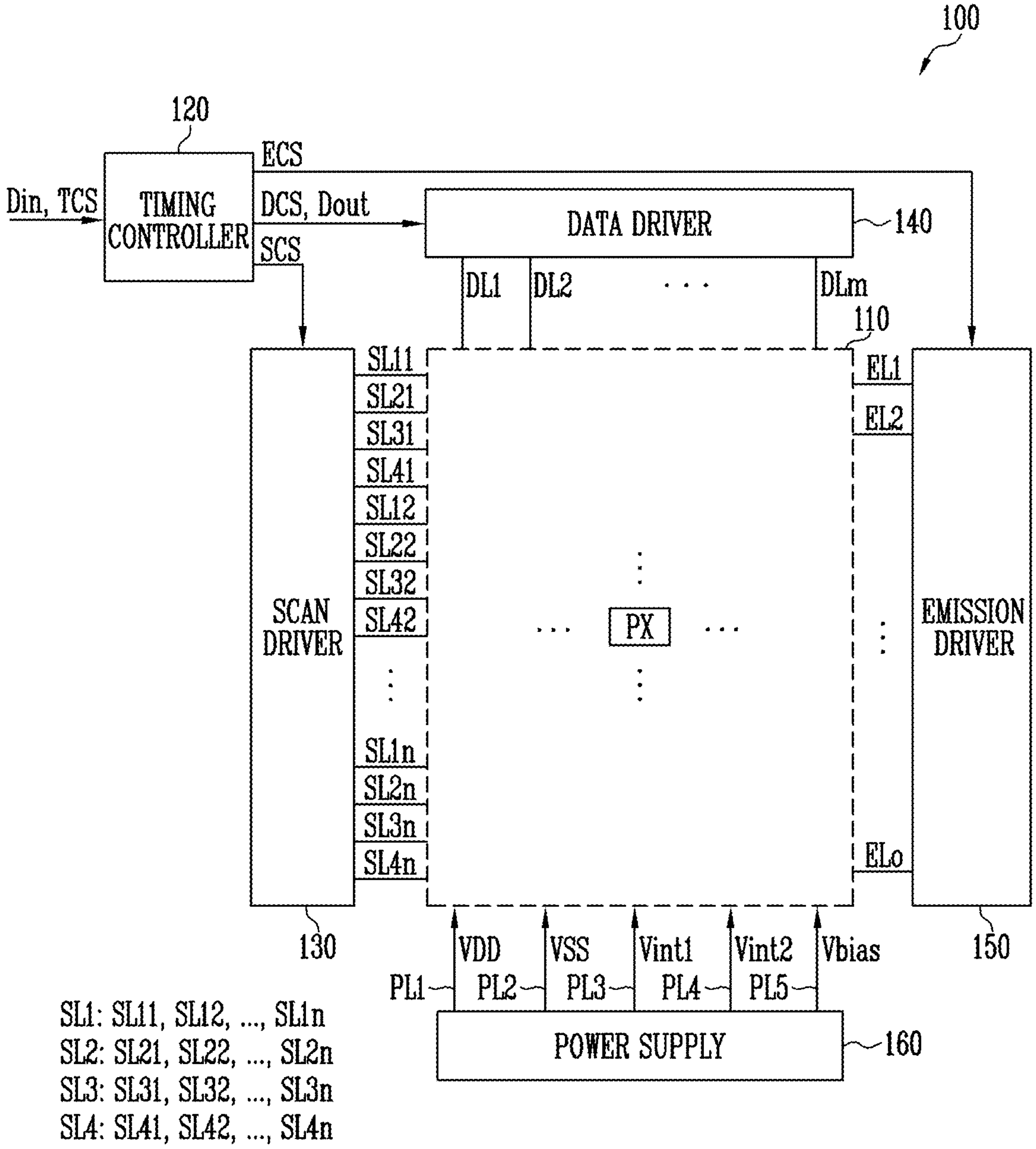
FIG. 1 is a diagram illustrating a display device according to an embodiment of the present inventive concept.

Hereinafter, display devices in accordance with embodiments will be described in more detail with reference to the accompanying drawings. The described embodiments may be modified in various different ways without departing from the spirit or scope of the present disclosure.

The same reference numerals are used for the same components in the drawings.

Furthermore, the expression "being the same" may mean "being substantially the same". In other words, the expression "being the same" may include a range that can be tolerated by those skilled in the art.

Some embodiments are described in the accompanying drawings with respect to functional blocks, units, and/or modules. Those skilled in the art will appreciate that such blocks, units, and/or modules are physically implemented with logic circuits, separate components, microprocessors, hard wire circuits, memory devices, wiring connections, and other electronic circuits. Such blocks, units, and/or modules may be formed using semiconductor-based manufacturing techniques. Blocks, units and/or modules implemented with microprocessors or other similar hardware may be programmed and controlled using software to perform various functions, and may be driven by firmware and/or software. In addition, each block, unit, and/or module may be implemented with dedicated hardware, or may be implemented with a combination of dedicated hardware performing some functions and a processor (e.g., one or more programmed microprocessors and associated circuit) performing other functions. In addition, blocks, units, and/or modules may be physically separated into two or more separate blocks, units, or modules that interact without departing from the scope of the inventive concept. Alternatively, blocks, units, and/or modules may be physically combined into more complex blocks, units, or modules without departing from the scope of the inventive concept of the present disclosure.

The term "connection" between two elements may mean, but is not necessarily limited to, the comprehensive use of both electrical and physical connections. For example, a "connection" used with reference to a circuit diagram may mean an electrical connection.

It will be understood that, although the terms "first", "second", or the like may be used herein to describe various elements, these elements should not be limited by these terms. These terms are only used to distinguish one element from another element. For instance, a first element in one embodiment may indicate a second element in other embodiments without departing from the teachings of the present disclosure. Likewise, the second element in one embodiment may indicate the first element in other embodiments.

According to embodiments of the present inventive concept, a display device includes a plurality of pixels, each pixel of the plurality of pixels includes a driving transistor, in which the driving transistor receives a data signal and drives a driving current to a light emitting device based on the data signal, a bias transistor which supplies bias power source to the driving transistor, and a scan driver provides a bias scan signal to the bias transistor. The bias scan signal has a first width during a display-scan period and has a second width during a self-scan period, and the second width is different from the first width. By controlling the first and second widths differently, luminace variation between the display-scan period and the self-scan period may be minimized, thereby display quality of the display devices is improved.

FIG. 1 is a diagram illustrating a display device 100 according to an embodiment of the present inventive concept.

Referring to FIG. 1, the display device 100 may include a pixel portion 110, a timing controller 120, the scan driver 130, a data driver 140, the emission driver 150, and a power supply 160. The pixel portion 110 is also referred to as a display panel.

The display device 100 may display images on the pixel portion 110 with different image refresh rates depending on driving conditions of the display device 100 such as driving frequencies or screen display rates. The pixel portion 110 may include a plurality of pixels PX, and each of the plurality of pixels PX may receive a data signal and emit light based on the received data signal with an image refresh rate selected from the different image refresh rates. The image refresh rate may refer to a frequency at which the data signal is received and displayed by the display device 100. More particularly, the image refresh rate may be indicated with a number of refreshing the display image in a second. For example, the image refresh rate for driving a video may be a frequency of 60 Hz or higher (e.g., 120 Hz, 240 Hz, or the like), in which 60 Hz of the image refresh rate indicates that the display image is reproduced or refreshed 60 times in a second. The image refresh rate may also be referred to as a scanning rate or a screen display frequency.

According to an embodiment, a data driver 140 may provide the pixels PX with data signals in accordance with the image refresh rate, and a scan driver 132 may provide the pixels PX with a scan signal in accordance with the image refresh rate. The pixels PX may include a plurality of pixel rows and a plurality of pixel columns. Each pixel row may also be referred to as a horizontal line, and include pixels PX connected to a same scan line. The scan signal may also be referred to as a write scan signal, and select a pixel row among the plurality of pixel rows for driving the data signals to the selected pixel row.

Although the image refresh rate for driving a video is exemplified here, the image refresh rates are not limited to a specific number. The display device 100 may also display an image with an image refresh rate of 240 Hz or higher (e.g., 480 Hz).

The scan driver 130 may include first to nth scan drivers. Each of the first to nth scan drivers may drive a scan line connected to corresponding pixel row among the plurality of pixel rows of the pixel portion 110. More particularly, the first scan driver may drive the first scan lines SL11 to SL1*n* connected to first to nth pixel rows of the pixel portion 110, where n is natural number of two or greater. The second scan driver may drive the second scan lines SL21 to SL2*n* connected to first to nth pixel rows of the pixel portion 110. The third scan driver may drive the third scan lines SL31 to SL3*n* connected to first to nth pixel rows of the pixel portion 110. The fourth scan driver may drive the fourth scan lines SL41 to SL4*n* connected to first to nth pixel rows of the pixel portion 110. The data driver 140 may drive data lines DL1 to DLm connected to first to mth pixel columns of the pixel portion 110, where m is natural number of two or greater. The pixel column is also referred to as a vertical line. The emission driver 150 may generate emission control signals and provide the pixel portion 110 with the emission control signals through emission control lines EL1 to Elo, where o is natural number of two or greater. The power supply 160 may provide various power voltages to the pixel portion 110 through power lines PL1, PL2, PL3, PL4, and PL5.

For example, a pixel PXij which is located on an ith pixel row and a jth pixel column may receive first to fourth scan enable signals through an ith first scan line SL1*i*, an ith second scan line SL2*i*, an ith third scan line SL3*i*, and an ith fourth scan line SL4*i* respectively. The pixel PXij also may receive an emission enable control signal through a kth emission control line ELk, and receive a data signal through a jth data line DLj, where i is a natural number smaller than or equal to n, j is a natural number smaller than or equal to m, and k is a natural number smaller than or equal to o. When each of the emission control lines EL1 to ELo is connected to the pixels PX located on one pixel row, o may be a number equal to n. On the other hand, when each of the emission control lines EL1 to ELo is connected to the pixels PX located on two or more pixel rows, o may be a number less than n.

When a pixel row is selected by supplying scan enable signal to corresponding scan lines among the scan lines SL11 to SL4*n*, all of the pixels PX connected to the pixel row are selected for transmitting the data signals and driving the light emitting devices of the selected pixel row. More particularly, when a first scan enable signal is supplied through the first scan lines SL11 to SL1*n*, each of the pixels PX connected to the first scan enable signal are selected and may receive the data signal from one of the data lines DL1 to DLm connected to the selected pixel row. The selected pixels PX may generate a light emit signal based on the received data signal, and provide an emission enable control signal to the emission driver 150 through corresponding emission control line. The emission enable control signal may turn-on the light emitting diode of the selected pixel PX for emitting light with a predetermined luminance based on a voltage of the data signal. The scan driver 130 may receive a scan driving signal SCS from the timing controller 120. The scan driving signal SCS may include a scan start signal and a clock signal for the scan driver 130 to generate scan enable signals. The scan driver 130 may generate the first scan enable signal, a second scan enable signal, a third scan enable signal, and a fourth scan enable signal by shifting the scan start signal in response to toggling of the clock signal. The first to fourth scan enable signals are also referred to as a bias scan signal.

The data driver 140 may receive output data Dout and a data driving signal DCS from the timing controller 120. The data driving signal DCS may include a sampling signal and/or timing signals for the data driver 140 to generate a data signal in response to the sampling signal and/or timing signals. The data driver 140 may generate the data signal based on the data driving signal DCS and the output data Dout, and drive data lines DL1 to DLm with the data signal. For example, the data driver 140 may generate an analog data signal based on a grayscale of the output data Dout. The data driver 140 may supply the data signal to the selected pixel row during access period of the selected pixel row.

The emission driver 150 may receive an emission driving signal ECS from the timing controller 120. The emission driving signal ECS may include an emission start signal and clock signals. The emission driver 150 may generate an emission enable control signal EM by shifting the emission start signal in response to toggling of the clock signal, and drive the emission control lines EL1 to ELo with the emission enable control signal EM.

Figure 2:
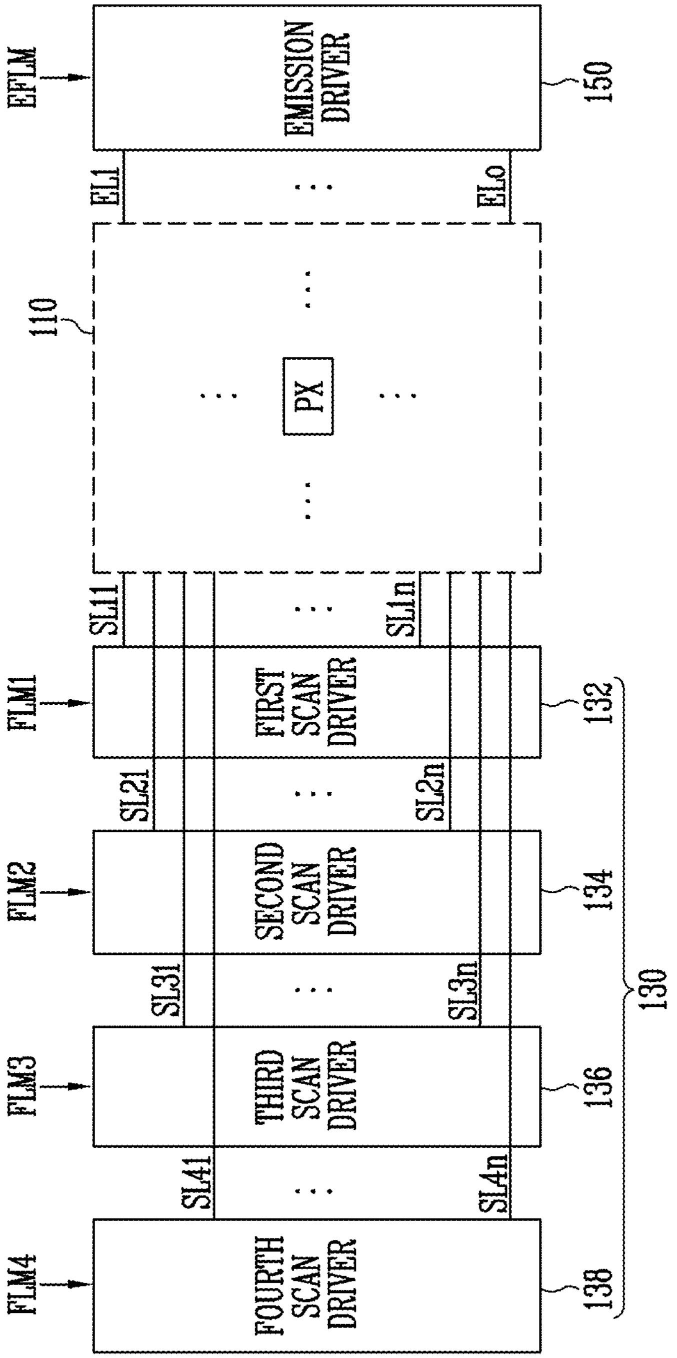
FIG. 2 is a diagram illustrating an embodiment of a scan driver and an emission driver shown in FIG. 1.

FIG. 2 is a diagram illustrating a scan driver and an emission driver of FIG. 1. Referring to FIG. 2, the scan driver 130 may include a first scan driver 132, a second scan driver 134, a third scan driver 136, and a fourth scan driver 138. The first to fourth scan drivers 132, 134, 136, and 138 may be disposed in independent form of circuit blocks or may be disposed in an integrated form of a circuit block or a module.

The first scan driver 132 may receive a first scan start signal FLM1 and generate the first scan enable signal by shifting the first scan start signal FLM1 in response to toggling of the clock signal. The first scan driver 132 may sequentially provide the first scan enable signal to the first scan lines SL11 to SL1*n* by shifting the first scan start signal FLM1. The first scan driver 132 may supply the first scan enable signal during a display-scan period of one frame. The term "one frame" may indicate a time period in which the display device 100 displays a single frame of image based on the data signal. The one frame may include a display-scan period and a self-scan period. In the display-scan period, the display device 100 displays an image based on the data signal received from the data driver 140 through the data lines DL1 to DLm. In the self-scan period, the display device 100 displays an image based on the stored data signal in the pixels.

The second scan driver 134 may receive a second scan start signal FLM2 and generate the second scan enable signal by shifting the second scan start signal FLM2 in response to toggling of the clock signal. The second scan driver 134 may sequentially provide the second scan enable signal to the second scan lines SL21 to SL2*n*. The second scan driver 134 may supply the second scan enable signal during a display-scan period of one frame.

The third scan driver 136 may receive a third scan start signal FLM3 and generate the third scan enable signal by shifting the third scan start signal FLM3 in response to toggling of the clock signal. The third scan driver 136 may sequentially provide the third scan enable signal to the third scan lines SL31 to SL3*n*. The third scan driver 136 may supply the third scan enable signal during a display-scan period of one frame.

The fourth scan driver 138 may receive a fourth scan start signal FLM4 and generate the fourth scan enable signal by shifting the fourth scan start signal FLM4 in response to toggling of the clock signal. The fourth scan driver 138 may sequentially provide the fourth scan enable signal to the fourth scan lines SL41 to SL4*n*.

The fourth scan driver 138 may supply the fourth scan enable signal during a display-scan period and a self-scan period of one frame. More specifically, the fourth scan driver 138 performs scanning operation during the display-scan period by supplying the fourth scan enable signal, and further performs scanning operation one or more times during the self-scan period. The self-scan period may be determined by the image refresh rate. For example, in a reduced image refresh rate or in an increased frame length, the fourth scan driver 138 may perform increased number of scanning operations during one frame period. Therefore, the fourth scan driver 138 may provide the fourth scan enable signal to each of the fourth scan lines SL41 to SL4*n* in a frequency proportional to increase of the frame length.

The first scan enable signal, the second scan enable signal, the third scan enable signal, and the fourth scan enable signal may have a voltage level that may turn on write transistors of the pixels PX connected with the first to fourth scan enable signals.

Although embodiment shown in FIG. 2 illustrates the first to fourth scan drivers 132, 134, 136 and 138 are connected to the first to fourth scan lines SL1, to SL4 respectively, embodiments of the present inventive concept are not limited thereto. For example, a single scan driver may drive two or more of the first to fourth scan lines SL1, to SL4.

Referring to FIG. 2, the emission driver 150 may receive an emission start signal EFLM and generate the emission enable control signal EM by shifting the emission start signal EFLM in response to toggling of the clock signal. The emission driver 150 may sequentially provide the emission enable control signal EM to the pixels PX of the pixel portion 110 through emission control lines EL1 to ELo. When the pixels PX are not emitting light, the emission enable control signal EM may be set to a gate-off voltage and the transistor controlled by the emission enable control signal EM in the pixels PX may be in a turn-off state. For example, when the transistor controlled by the emission enable control signal EM is a P-type transistor, the emission driver 150 may drive the voltage level of the emission enable control signal EM to a logic high-level.

The emission driver 150 may provide a emission enable control signal during a display-scan period and a self-scan period of one frame. More particularly, the emission driver 150 may perform a scanning operation once during the display-scan period, and may perform scanning operation one or more times during the self-scan period. The self-scan period may be determined according to an image refresh rate at which the display device 100 operates. The emission driver 150 may provide the emission enable control signal to each of the emission control lines EL1 to ELo in a frequency proportional to increase of the frame length during one frame period.

The timing controller 120 may receive input data Din and a timing control signal TCS from a host system through an interface. More particularly, the timing controller 120 may receive the input data Din and the timing control signal TCS from at least one of a graphics processing unit (GPU), a central processing unit (CPU), or an application processor (AP) included in the host system. The timing control signal TCS may include a clock signal.

The timing controller 120 may generate the scan driving signal SCS, the data driving signal DCS, and the emission driving signal ECS based on the timing control signal TCS, and provide the scan driving signal SCS, the data driving signal DCS, and the emission driving signal ECS to the scan driver 130, the data driver 140, and the emission driver 150 respectively.

The timing controller 120 may rearrange the input data Din in accordance with the data specification of the display device 100, and generate the output data Dout based on the input data Din. The data driver 140 may receive the output data Dout for generating data signals based on the received output data and providing the data signals to pixels PX. The timing controller 120 may correct the input data Din based the optical measurement result for sustaining uniform luminance level of the display panel.

The power supply 160 may generate various power sources necessary for driving the display device 100. The power supply 160 may generate a first driving power source VDD, a second driving power source VSS, a first initialization power source Vint1, a second initialization power source Vint2, and a bias power source Vbias.

The first driving power source VDD and the second driving power source VSS may be connected to the pixels PX of the display device 100 for supplying a driving current to the pixels PX. The voltage level of the first driving power source VDD may be higher than that of the second driving power source VSS.

The first initialization power source Vint1 may be provided to a driving transistor of the pixels PX and may initialize a gate electrode of the driving transistor. The voltage level of the first initialization power source Vint1 may be lower than that of the data signal. The second initialization power source Vint2 may initialize a first electrode, which is an anode electrode of a light emitting device LD of the pixels PX. The voltage level of the second initialization power source Vint2 may be set to turn-off the light emitting device LD. The bias power source Vbias may apply an on-bias voltage to the driving transistor of the pixels PX.

The power supply 160 may provide the first driving power source VDD through a first power line PL1, the second driving power source VSS through a second power line PL2, the first initialization power source Vint1 through a third power line PL3, the second initialization power source Vint2 through a fourth power line PL4, and the bias power source Vbias through a fifth power line PL5. The fifth power line PL5 is also referred to as a bias power line. The first to fifth power lines PL1 to PL5 may be connected to the pixels PX, but embodiments of the present disclosure are not limited thereto.

The first to fifth power lines PL1 to PL5 may include a plurality of power lines connected to different pixels PX respectively. Each of the pixels PX may be connected to one of the first power lines PL1, one of the second power lines PL2, one of the third power lines PL3, one of the fourth power lines PL4, and one of the fifth power lines PL5.

The display device 100 may include a flat display device, a curved display device in which a part of the pixel portion 110 is bent, a flexible display device in which a part of the pixel portion 110 may be folded or bent, and a stretchable display device in which a part of the pixel portion 110 is stretched and contracted.

The display device 100 displays a moving image or a still image, and may include a portable electronic device such as a mobile phone, a smartphone, a tablet personal computer (PC), a smartwatch, a watch phone, a mobile communication terminal, an electronic notebook, an electronic book, a portable multimedia player (PMP), a navigation device, or an ultra-mobile PC (UMPC). The display device 100 may be applied to electronic devices such as a television, a notebook computer, a monitor, a billboard, and an Internet of Things (IoT) device.

Figure 3:
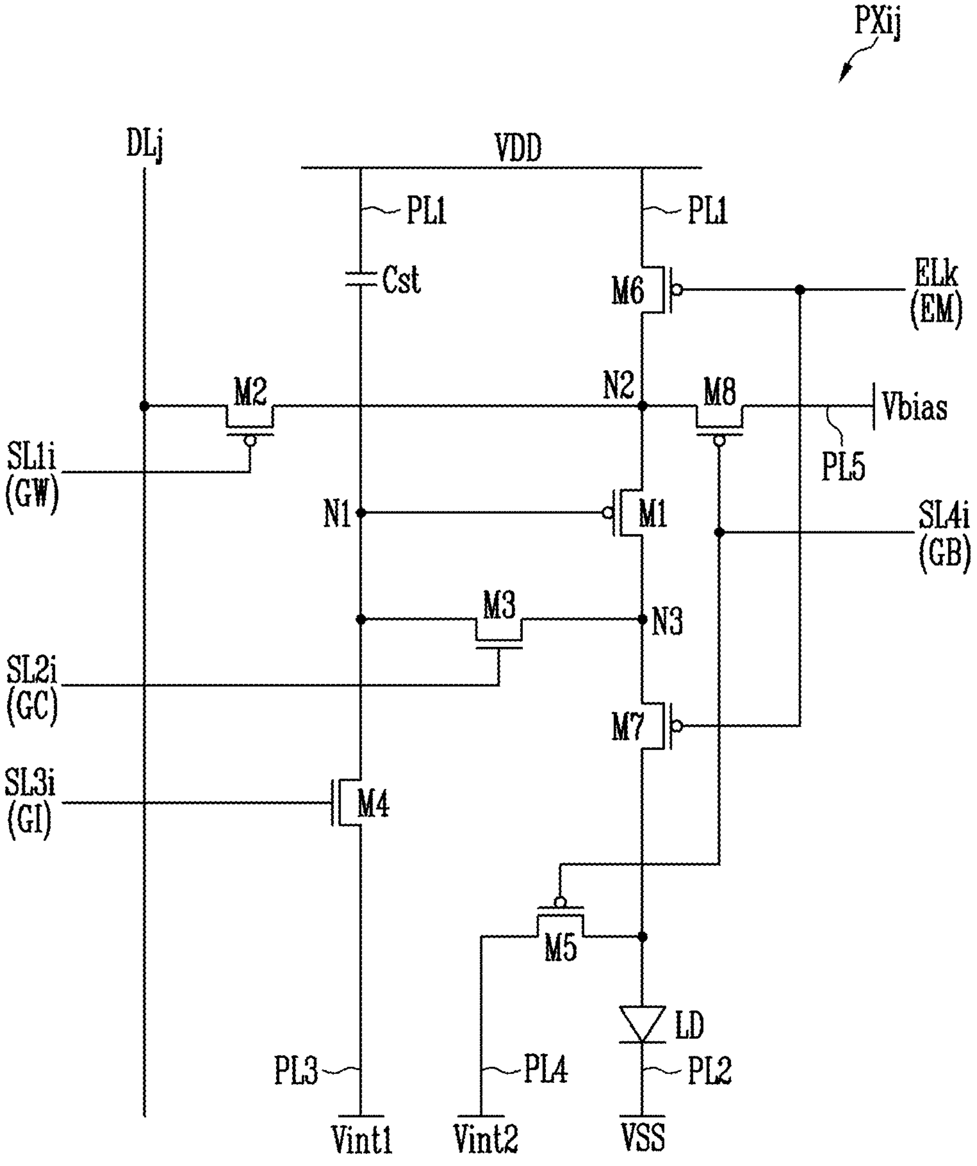
FIG. 3 is a diagram illustrating a pixel according to an embodiment.

FIG. 3 is a diagram illustrating a pixel according to an embodiment of the present disclosure. FIG. 3 shows a pixel PXij located on the ith pixel row and the jth pixel column.

Referring to FIG. 3, the pixel PXij may be connected to corresponding scan enable signal lines SL1*i*, SL2*i*, SL3*i*, SL4*i*, emission control line ELk, and data line DLj. More specifically, the pixel PXij may be connected to the ith first scan line SL1*i*, the ith second scan line SL2*i*, the ith third scan line SL3*i*, the ith fourth scan line SL4*i*, the kth emission control line ELk, and the jth data line DLj. The pixel PXij may be further connected to the first power line PL1, the second power line PL2, the third power line PL3, the fourth power line PL4, and the fifth power line PL5.

The pixel PXij may include the light emitting device LD and a pixel circuit for controlling the driving current supplied to the light emitting device LD.

The light emitting device LD may be connected between the first power line PL1 and the second power line PL2. More specifically, a first electrode of the light emitting device LD may be electrically connected to the first power line PL1 through a seventh transistor M7, a third node N3, a first transistor M1, a second node N2, and a sixth transistor M6, and a second electrode of the light emitting device LD may be electrically connected to the second power line PL2. The first electrode of the light emitting device LD may be referred to as an anode electrode of the light emitting device LD, and the second electrode of the light emitting device LD may be referred to as an cathode electrode of the light emitting device LD. The light emitting device LD may emit light of a predetermined luminance in proportion to the amount of driving current flowing into the anode electrode of the light emitting device LD.

The light emitting device LD may be an organic light emitting diode, an inorganic light emitting diode such as a micro light emitting diode (LED) or a quantum dot light emitting diode. In addition, the light emitting device LD may be a device including a combination of organic and inorganic materials. Although FIG. 3 illustrates that the pixel PXij includes a single light emitting device LD, the pixel PXij may include a plurality of light emitting devices LD which may be connected in series, in parallel, or in a combination of serial-parallel connection.

The pixel circuit may include the first transistor M1, a second transistor M2, a third transistor M3, a fourth transistor M4, a fifth transistor M5, the sixth transistor M6, the seventh transistor M7, an eighth transistor M8, and a storage capacitor Cst.

A first electrode of the first transistor M1, which is also referred to as a driving transistor, may be connected to the second node N2, and a second electrode may be connected to the third node N3. A gate electrode of the first transistor M1 may be connected to a first node N1. The first transistor M1 may control the amount of driving current flowing through the light emitting device LD by controlling voltage level of the first node N1.

The second transistor M2 may be connected between the data line DLj and the second node N2. A gate electrode of the second transistor M2 may be electrically connected to the first scan line SL1*i*. When the first scan enable signal GW is supplied to the first scan line SL1*i*, the second transistor M2 may be turned on to electrically connect the data line DLj and the second node N2.

The third transistor M3 may be connected between the first node N1 and the third node N3. A gate electrode of the third transistor M3 may be electrically connected to the second scan line SL2*i*. When the second scan enable signal GC is supplied to the second scan line SL2*i*, the third transistor M3 may be turned on to electrically connect the first node N1 and the third node N3. When the third transistor M3 is turned on, the first transistor M1 may be connected in a form of a diode and drive the driving current in portion to voltage level of the first node N1.

A first electrode of the fourth transistor M4 may be connected to the first node N1, and a second electrode may be electrically connected to the third power line PL3. A gate electrode of the fourth transistor M4 may be electrically connected to the third scan line SL3*i*. When the third scan enable signal GI is applied to the third scan line SL3*i*, the fourth transistor M4 may be turned on to supply the voltage of the first initialization power source Vint1 to the first node N1.

A first electrode of the fifth transistor M5 may be connected to the first electrode of the light emitting device LD, and a second electrode may be electrically connected to the fourth power line PL4. A gate electrode of the fifth transistor M5 may be electrically connected to the fourth scan line SL4*i*. When the fourth scan enable signal GB is applied to the fourth scan line SL4*i*, the fifth transistor M5 may be turned on to supply the voltage of the second initialization power source Vint2 to the first electrode of the light emitting device LD.

When the voltage of the second initialization power source Vint2 is supplied to the first electrode of the light emitting device LD, a parasitic charge accumulated on the first electrode of the light emitting device LD may be discharged. As a residual voltage due to the parasitic charge accumulated on the first electrode of the light emitting device LD is removed, unintended fine emission of the pixel PXij may be prevented, and the black representation capability of the pixel PXij may be improved.

A first electrode of the sixth transistor M6 may be electrically connected to the first power line PL1, and a second electrode may be connected to the second node N2. A gate electrode of the sixth transistor M6 may be electrically connected to the emission control line ELk. The sixth transistor M6 may be turned off when the voltage level of the emission enable control signal EM applied to the emission control line Elk corresponds to turn-off voltage, and may be turned on when an emission enable control signal applied to the sixth transistor M6 corresponds to turn-on voltage. The turn-off voltage of emission enable control signal EM may be logic high-level, and the turn-on voltage of emission enable control signal EM may be logic low-level.

The seventh transistor M7 may be connected between the third node N3 and the first electrode of the light emitting device LD. A gate electrode of the seventh transistor M7 may be electrically connected to the emission control line ELk. The seventh transistor M7 may be turned off when the voltage level of the emission enable control signal EM applied to the emission control line Elk corresponds to turn-off voltage, and may be turned on when the voltage level of the emission enable control signal applied to the emission control line Elk corresponds to turn-on voltage.

A first electrode of the eighth transistor M8, also referred to as a bias transistor, may be electrically connected to the fifth power line PL5, and a second electrode may be connected to the second node N2. A gate electrode of the eighth transistor M8 may be electrically connected to the fourth scan line SL4*i*. When the fourth scan enable signal GB is applied to the fourth scan line SL4*i*, the eighth transistor M8 may be turned on to electrically connect the fifth power line PL5 and the second node N2.

The storage capacitor Cst may be connected between the first power line PL1 and the first node N1. The storage capacitor Cst may store charges supplied to the first node N1 and maintain voltage level of the first node during the self-scan period.

The first to eight transistors M1 to M8 may be implemented with polysilicon semiconductor transistors. The polysilicon semiconductor transistors may be formed with a polysilicon semiconductor layer which is formed through a low temperature poly-silicon (LTPS) process. More specifically, the first transistor M1, the second transistor M2, the fifth transistor M5, the sixth transistor M6, the seventh transistor M7, and the eighth transistor M8 may be implemented with P-type polysilicon semiconductor transistors which are formed in an N-type active layer. Because the first transistor M1, the second transistor M2, the fifth transistor M5, the sixth transistor M6, the seventh transistor M7, and the eighth transistor M8 are PMOS transistors, a gate electrode voltage for turning on the first transistor M1, the second transistor M2, the fifth transistor M5, the sixth transistor M6, the seventh transistor M7, and the eighth transistor M8 may be a logic low level. Due to a high response speed of polysilicon semiconductor transistors, the pixel circuit may perform fast switching operation and may improve display quality of the display device 100.

The third transistor M3 and the fourth transistor M4 may be implemented with oxide semiconductor transistors. More particularly, the third transistor M3 and the fourth transistor M4 may be N-type oxide semiconductor transistors, and may include an oxide semiconductor layer as an active layer. Because the third transistor M3 and the fourth transistor M4 are NMOS transistor, a gate electrode voltage for turning on the third transistor M3 and the fourth transistor M4 may be a logic high level.

Oxide semiconductor transistors can be processed at low temperatures and have lower charge mobility than polysilicon semiconductor transistors. Because the oxide semiconductor transistors have excellent off-state current characteristics, voltage drop of the first node N1 due to leakage current may be minimized. Especially, when the display panel operates at a low frequency, due to limited leakage current through the third and fourth transistors M3 and M4, display quality of the display device may be preserved.

Figure 4:
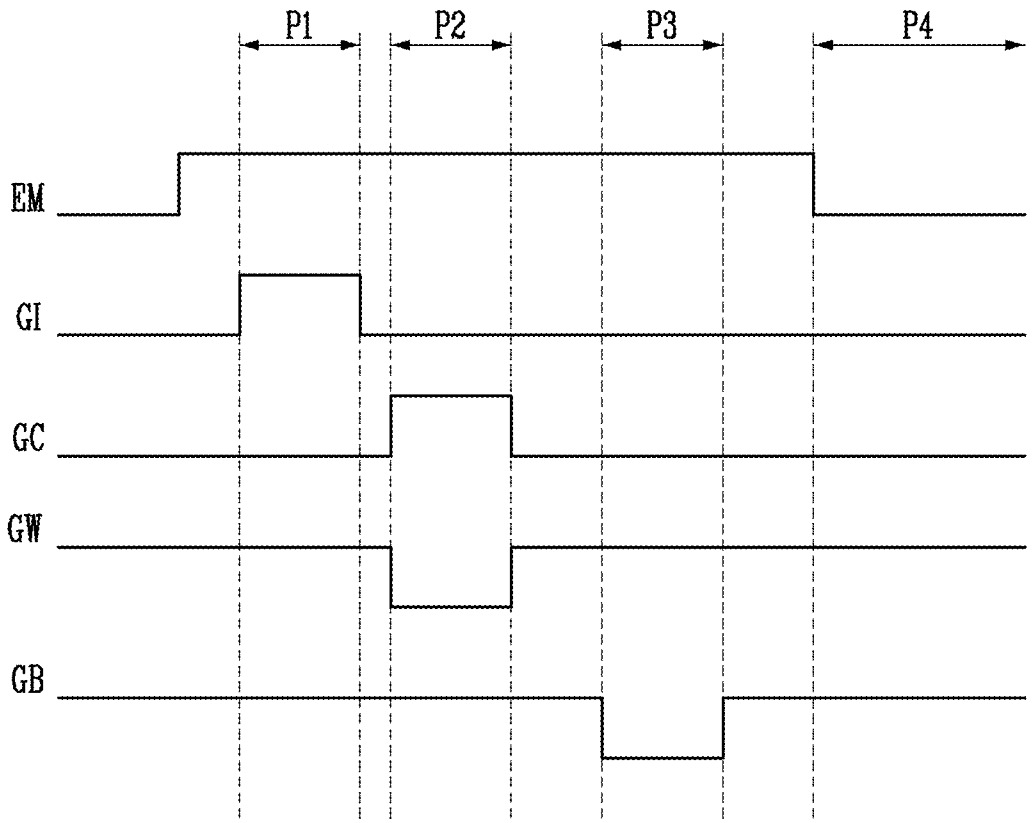
FIG. 4 is a waveform diagram illustrating a driving method of a pixel of FIG. 3 during a display-scan period.

FIG. 4 is a waveform diagram illustrating a method of driving the pixel of FIG. 3 during a display-scan period DSP. The display-scan period may be a portion of an active period in a frame.

Referring to FIGS. 3 and 4, the display-scan period DSP may include a first period P1, a second period P2, a third period P3, and a fourth period P4. The first to third periods P1 to P3 may be a non-emission periods, in which the pixel circuit receives data signal and starts drive the driving transistor based on the received data signal. The fourth period P4 may be an emission period, in which the light emitting diode emits light based on the driving current.

The emission enable control signal EM applied to the emission control line ELk may have turn-off level during the first to third periods P1 to P3, and the sixth transistor M6 and the seventh transistor M7 are turned off during the first to third periods P1 to P3, and the electrical connection between the first power line PL1 and the light emitting device LD is cut off, and the light emitting device LD remains in a non-emission state.

During the first period P1, the third scan enable signal GI is supplied to the third scan line SL3*i*. When the third scan enable signal GI is applied to the third scan line SL3*i*, the fourth transistor M4 is turned on, and the voltage of the first initialization power source Vint1 of the third power line PL3 may be supplied to the first node N1.

During the second period P2, the second scan enable signal GC is applied to the second scan line SL2*i*, and the third transistor M3 is turned on. Accordingly, the first transistor M1 may be connected in a form of a diode, and the driving current may flow through the first transistor M1 inversely proportional to the voltage level of the first node N1.

In addition, during the second period P2, the first scan enable signal GW is applied to the first scan line SL1*i*, and the second transistor M2 is turned on, and a data signal of the data line DLj may be supplied to the second node N2. Because the first transistor M1 is connected in a form of diode as third transistor M3 is turned on, the first node N1 may have a voltage level lower than a voltage level of the data signal even after compensating a threshold voltage of the first transistor M1. The driving current may flow through the first transistor M1 based on voltage difference between voltage level of the data signal and voltage level of the first node N1.

During the third period P3, the fourth scan enable signal GB is applied to the fourth scan line SL4*i*, and the fifth transistor M5 and the eighth transistor M8 are turned on. Because the fifth transistor M5 is turned on, the second initialization power source Vint2 is supplied to the first electrode of the light emitting device LD, and the light emitting device LD may be initialized. Because the eighth transistor M8 is turned on, the bias power source Vbias is supplied to the second node N2, and the driving current may be set to flow through the first transistor M1 based on the data signal and the bias power source Vbias supplied to the second node N2.

During the fourth period P4, the emission enable control signal applied to the emission control line Elk may have voltage level to turn on the sixth transistor M6 and the seventh transistor M7. Because the sixth transistor M6 and the seventh transistor M7 are P-type transistors, the voltage level of the emission enable control signal EM may be logic-low level. As the sixth transistor M6 and the seventh transistor M7 are turned on, a current path between the first power line PL1 to the second power line PL2 is formed and, the driving current flows through the sixth transistor M6, the first transistor M1, the seventh transistor M7, and the light emitting device LD. When the sixth and seventh transistors M6 and M7 are turned on, the first transistor M1 may drive the driving current inversely proportional to the voltage level of the first node N1, and the light emitting device LD may emit light with a luminance corresponding to the driving current.

Figure 5:
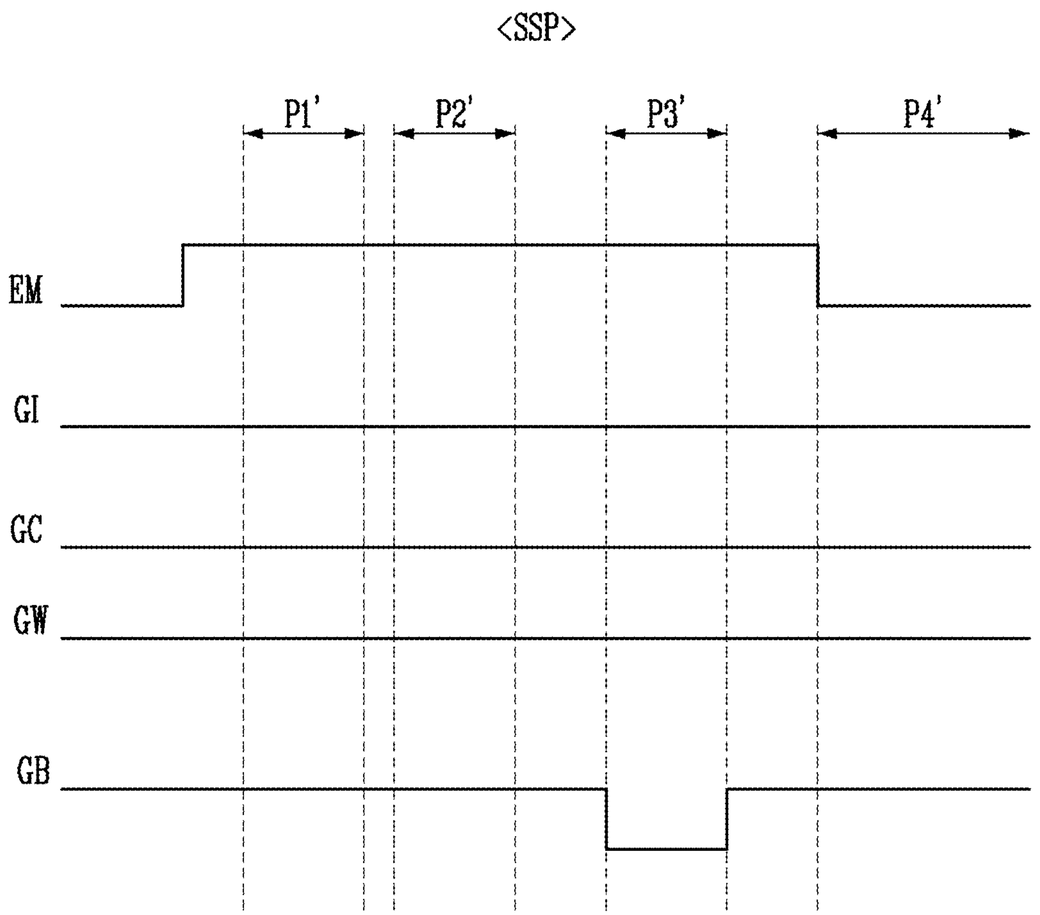
FIG. 5 is a waveform diagram illustrating a driving method of the pixel of FIG. 3 during a self-scan period.

FIG. 5 is a waveform diagram illustrating a method of driving the pixel of FIG. 3 during a self-scan period SSP. During the self-scan period SSP, the pixels PX may continuously emit light by maintaining previously supplied data signal, thereby the display device 100 may continuously display an image without switching a frame. According to an embodiment, one frame period may include one display-scan period DSP and one or more self-scan periods SSP. One or more self-scan periods SSP may immediately follow the display-scan period DSP. The self-scan period SSP may also be applied to a blank period of the frame.

In the self-scan period SSP, because previously supplied data signal is maintained in the pixel circuit, the second transistor M2 may be turned-off to stop receiving data from the data lines DL, and the third transistor M3 may be turned-off to disconnect the diode connection of the transistor M1. Instead, an operation of applying a bias voltage to the first transistor M1 may be continuously performed during at each stage of the self-scan periods SSP to continue light emitting operation. A length of each self-scan period SSP may be same or similar to a length of the display-scan period DSP. As illustrated in FIG. 5, the self-scan period SSP may include a first period P1', a second period P2', a third period P3', and a fourth period P4'.

Referring to FIGS. 3 and 5, the emission enable control signal EM applied to the emission control line ELk may be set to turn off the sixth transistor M6 and the seventh transistor M7 during the first to third periods P1' to P3'. Accordingly, the light emitting device LD may remain in a non-emission state.

The first scan enable signal GW, the second scan enable signal GC, and the third scan enable signal GI are disabled during the first period P1', the second period P2', and the third period P3'. Accordingly, the second transistor M2, the third transistor M3, and the fourth transistor M4 are set to be in a turn-off state during the first period P1', the second period P2', and the third period P3'.

The fourth scan enable signal GB may be applied to the fourth scan line SL4*i* during the third period P3'. When the fourth scan enable signal GB is supplied to the fourth scan line SL4*i*, the fifth transistor M5 and the eighth transistor M8 may be turned on.

When the fifth transistor M5 is turned on, the second initialization power source Vint2 is supplied to the first electrode of the light emitting device LD, and light emitting operation of the light emitting device LD may be initialized. When the eighth transistor M8 is turned on, the bias power source Vbias is supplied to the second node N2, and the first transistor M1 may be set to be in the on-bias state, in which the first transistor drives the driving current based on the voltage level of the first node N1.

The display device 100 may operate at various different driving frequencies because one frame period includes both the display-scan period DSP and the self-scan period SSP, and the number of the self-scan period SSP in a frame may vary depending on operation status of the display panel. The various different driving frequencies may also be referred to as various frame frequencies.

Figure 6:
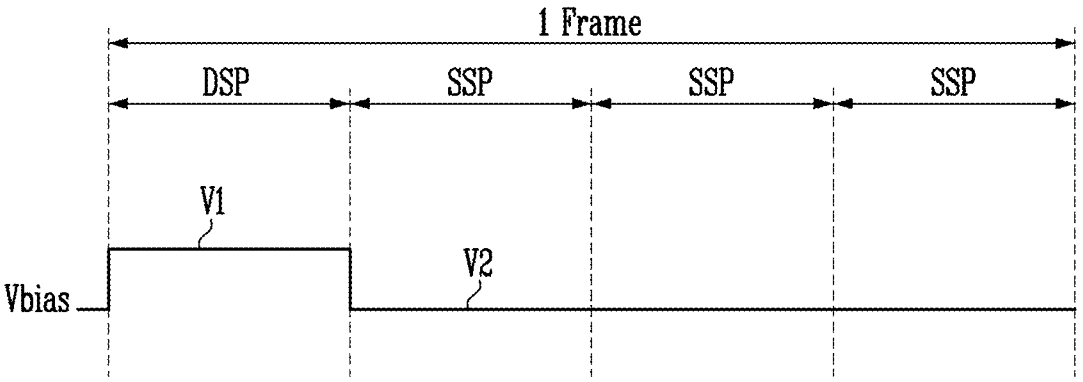
FIG. 6 is a diagram illustrating a bias power source supplied during one frame period.

FIG. 6 is a diagram illustrating the bias power source Vbias supplied during one frame period. Although FIG. 6 illustrates that one frame period includes three self-scan periods SSP, the number of the self-scan periods SSP in a frame period may vary depending on operation status of the display panel.

Referring to FIG. 6, the voltage level of the bias power source Vbias may be different during the display-scan period DSP and the self-scan period SSP. The pixels PX may emit light immediately after the data signal is input during the display-scan period DSP, and may continue to emit light during the self-scan period SSP by maintaining previously received data signal during the display scan period. The luminance levels of the pixel portion 110 during the display-scan period DSP and the self-scan period SSP may be different to each other. The voltage level of the bias power source Vbias may be set differently, thereby minimizing or reducing the luminance level difference of the pixel portion 110 between the display-scan period DSP and the self-scan period SSP.

More particularly, during the display-scan period DSP, the bias power source Vbias may be set to a first voltage V1, and during the self-scan period SSP, the bias power source Vbias may be set to a second voltage V2. The level of the first voltage V1 may be higher than that of the second voltage V2.

When the display-scan period DSP is transitioned to the self-scan period SSP in a frame period, the luminance level of a display image displayed by the pixels PX during the display-scan period DSP may be changed. Accordingly, the luminance level of a display image during the self-scan period SSP and may be different from the luminance level of a display image during the display-scan period DSP. By changing the bias power source Vbias from the first voltage V1 to the second voltage V2 when the display-scan period DSP is transitioned to the self-scan period SSP in a frame period, the luminance difference between the self-scan period SSP and the display-scan period DSP may be compensated and maintain stable luminance even after transitioning from the display-scan period DSP to the self-scan period SSP.

Figure 7:
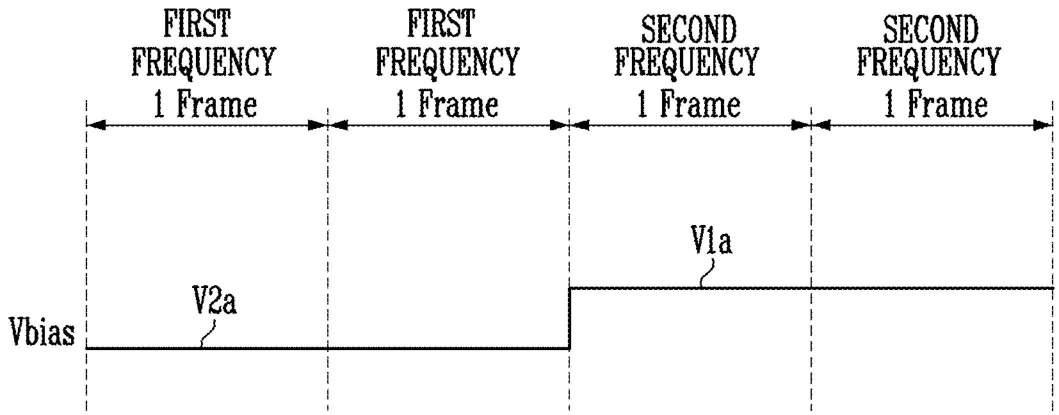
FIG. 7 is a diagram illustrating a bias power source at different driving frequencies.

FIG. 7 is a diagram illustrating an embodiment of a bias power source at different driving frequencies. The level of the bias power source Vbias may be differently set depending on the driving frequency as shown in FIG. 7. The voltage level of the bias power source Vbias for first frames having a first frequency may be set lower than the voltage level of the bias power source Vbias for second frames having a second frequency which is lower than the first frequency. For example, the first frequency may be 120 Hz and the second frequency may be 10 Hz.

Referring to FIG. 7, the voltage level of the bias power source Vbias may be set differently in accordance with a driving frequency of the display device 100. Likewise, the voltage level of the bias power source Vbias may be set differently in accordance with a length of one frame period because the length of one frame period is set differently in accordance with the driving frequency. For example, a length of one frame period of the first driving frequency may be longer than a length of one frame period of the second driving frequency. The first driving frequency is also referred to as a first image refresh rate, or a first screen display rate, and the second driving frequency is also referred to as a second image refresh rate, or a second screen display rate.

The voltage levels of the bias power source Vbias, at the first driving frequency and at the second driving frequency, may be set differently depending on the desired luminance level of a display image displayed by the pixels PX. When the display device 100 drives the display pixels PX at a first frequency, the bias power source Vbias may be set to a second voltage V2*a*, and when the display device 100 drives the display pixels PX at a second frequency, the bias power source Vbias may be set to a first voltage V1*a*. The first voltage V1*a* may be higher than the second voltage V2*a*.

Referring to FIG. 6, the first voltage V1 and/or the second voltage V2 may be set differently for the first driving frequency and the second driving. For example, a level of the first voltage V1 at the first driving frequency may be higher than a level of the second voltage V2 at the second driving frequency, where the first driving frequency is lower than the second driving frequency.

When the bias power source Vbias is changed from the second voltage V2*a* to the first voltage V1*a* or from the first voltage V1*a* to the second voltage V2*a* due to the change of the driving frequency, the luminance level may also be controlled according to the change of the driving frequency of the pixel portion 110.

Figure 8:
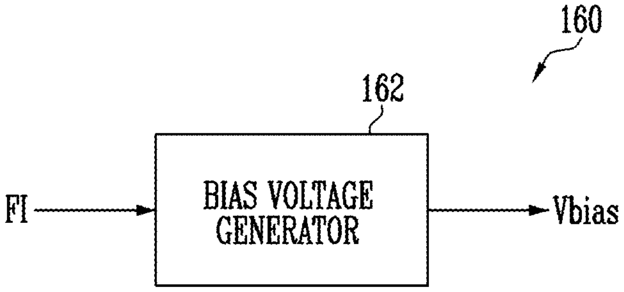
FIG. 8 is a diagram of a bias voltage generator according to an embodiment.
Figure 9:
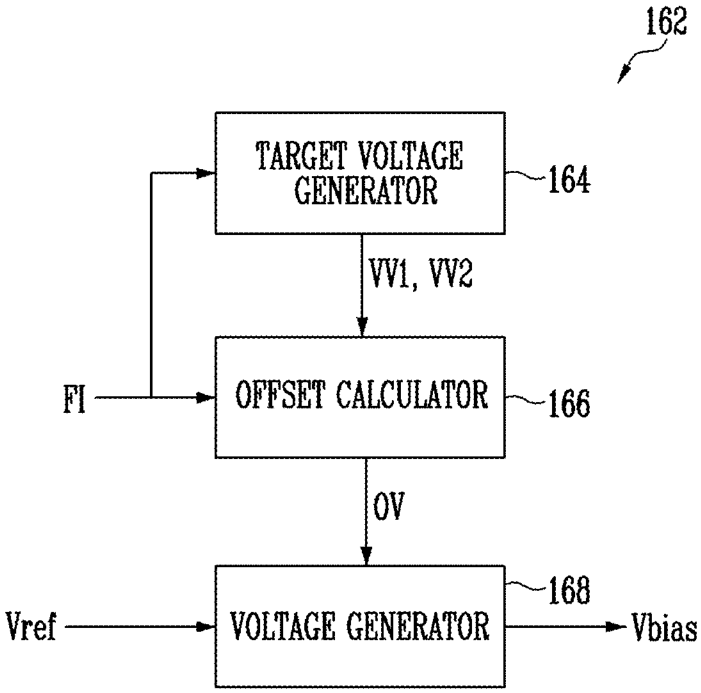
FIG. 9 is a diagram illustrating the bias voltage generator shown in FIG. 8.

FIG. 8 is a diagram illustrating a bias voltage generator 162 according to an embodiment. FIG. 9 is a diagram illustrating an embodiment of the bias voltage generator 162 shown in FIG. 8.

Referring to FIG. 8, the power supply 160 shown in FIG. 1, may include the bias voltage generator 162. The bias voltage generator 162 may receive driving frequency information FI and generate the bias power source Vbias in accordance with the driving frequency information FI. The bias voltage generator 162 may determine the driving frequency of the display device 100 based on the driving frequency information FI. The bias voltage generator 162 may also determine the number of self-scan periods SSP included in one frame period from the driving frequency information FI.

Figure 10:
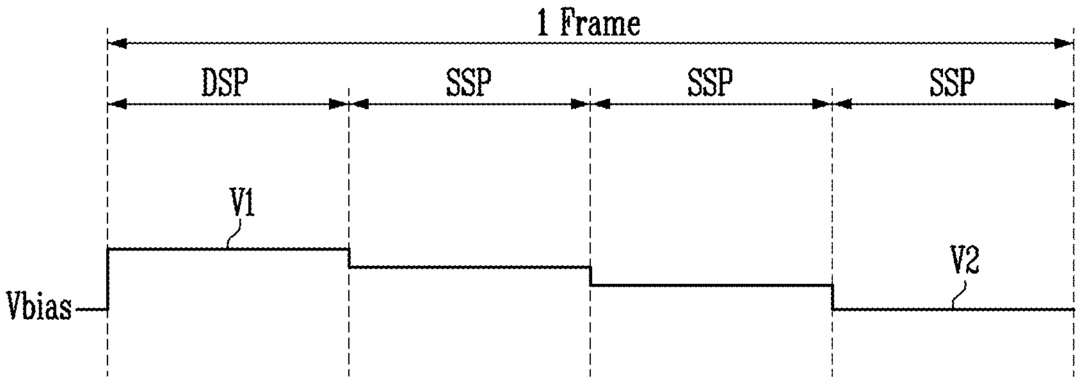
FIG. 10 is a diagram illustrating a bias power source generated by a bias voltage generator.
Figure 11:
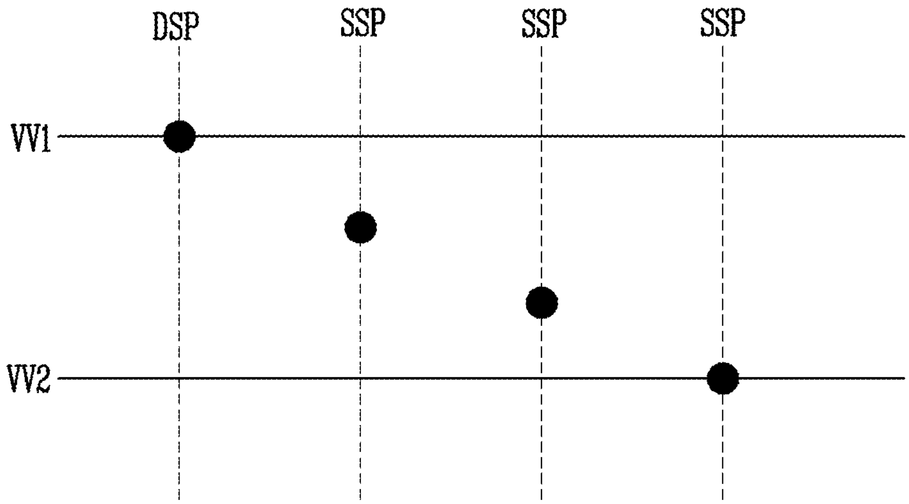
FIG. 11 is a diagram illustrating an operation process of an offset calculator shown in FIG. 9.
Figure 12:
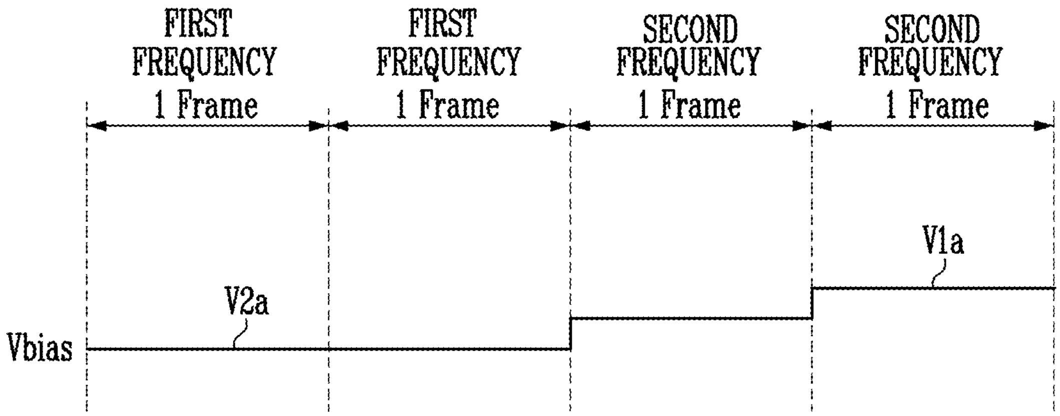
FIG. 12 is a diagram illustrating a bias power source generated by a bias voltage generator.

FIG. 10 is a diagram illustrating an embodiment of a bias power source generated by the bias voltage generator 162. FIG. 11 is a diagram illustrating an operation of an offset calculator 166 shown in FIG. 9. FIG. 12 is a diagram illustrating an embodiment of the bias power source generated by the bias voltage generator 162. Referring to FIG. 10, the bias voltage generator 162 may gradually lower the voltage of the bias power source Vbias in accordance with the number of self-scan periods SSP determined based on the driving frequency information FI.

The bias voltage generator 162 may include a target voltage generator 164, the offset calculator 166, and a voltage generator 168 as illustrated in FIG. 9.

Referring to FIG. 9 and FIG. 11, the target voltage generator 164 may generate a first voltage value VV1 and a second voltage value VV2 in accordance with the driving frequency information FI. The target voltage generator 164 may generate the first voltage value VV1 and the second voltage value VV2 based on the driving frequency. The first voltage value VV1 may correspond to a first level of the bias power source Vbias during the display-scan period, and the second voltage value VV2 may correspond to a second level of the bias power source Vbias during the self-scan period the second. The first voltage value VV1 and the second voltage value VV2 may be set differently in accordance with the driving frequency information FI.

The offset calculator 166 may determine the number of self-scan periods SSP during one frame period in accordance with the driving frequency information FI. Referring to FIG. 10, the offset calculator 166 may generate an offset value OV with which the voltage generator 168 may gradually lower the bias power source Vbias from the first voltage V1 to the second voltage V2 at each stage of the self-scan periods during one frame. The bias power source Vbias may have the first voltage V1 during the display-scan period DSP and may be lowered from the first voltage V1 to the second voltage V2 gradually at each stage of two or more self-scan periods SSP.

Referring to FIG. 9 and FIG. 11, the offset calculator 166 may generate the offset value OV for the voltage level of the bias power source Vbias to be gradually lowered from the first voltage value VV1 to the second voltage value VV2 during the self-scan periods SSP. The offset value OV that lowers the voltage level of the bias power source Vbias at each stage of the self-scan periods SSP may be set to be same or different.

The voltage generator 168 receives a reference voltage Vref and applies the offset value OV to the reference voltage Vref, thereby lowering the voltage level of the bias power source Vbias from the first voltage V1 to the second voltage V2 at each stage of the self-scan periods SSP during one frame period as shown in FIG. 10. The offset value OV that lowers the voltage level of the bias power source Vbias at each stage of self-scan periods SSP may be set to be same or different.

Additionally, the offset calculator 166 may determine whether the driving frequency is changed between frames based on the driving frequency information FI. When the driving frequency of the display device 100 is changed between frames, the offset calculator 166 may generate the offset value OV so that the voltage level of the bias power source Vbias is changed at each frame having different driving frequencies as shown in FIG. 12.

Referring to FIG. 12, the voltage level of the bias power source Vbias may maintain level of the second voltage V2*a* during first and second frame periods operating at first driving frequency. The voltage level of the bias power source Vbias may be changed from the second voltage V2*a* to the first voltage V1*a* gradually at third and fourth frame periods operating at second driving frequency. The first frequency is higher than the second frequency as shown in FIG. 12. The offset value OV may by adjusted accordingly to generate the first voltage V1*a* and the second voltage V2*a*. The voltage level of the bias power source Vbias may be increased from the second voltage V2*a* to the first voltage V1*a* gradually when the first frequency is higher than the second frequency.

The voltage generator 168 may receive the reference voltage Vref and adjust the reference voltage Vref by adding the offset value OV to the reference voltage Vref. Because the offset value OV is determined based on the driving frequency, the voltage level of the bias power source Vbias may be changed depending on the driving frequency.

Figure 13:
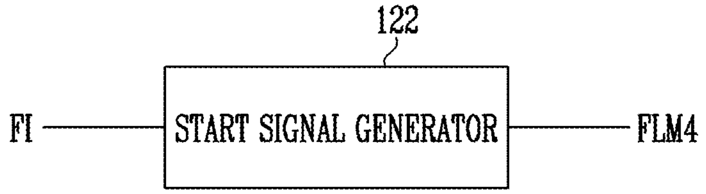
FIG. 13 is a diagram illustrating a start signal generator according to an embodiment.

FIG. 13 is a diagram illustrating a start signal generator 122 according to an embodiment. FIGS. 14 to 17 are diagrams illustrating bias scan signals generated from a start signal generated by the start signal generator 122. The timing controller 120 may include the start signal generator 122.

Referring to FIG. 13, the start signal generator 122 may control a width of the fourth scan start signal FLM4 based on the driving frequency information FI. Hereinafter, the fourth scan start signal FLM4 may be referred to as scan start signal. When the width of the scan start signal FLM4 is changed, a width of the fourth scan enable signal GB may also be changed. Hereinafter, the fourth scan enable signal GB is referred to as bias scan signal.

Figure 14:
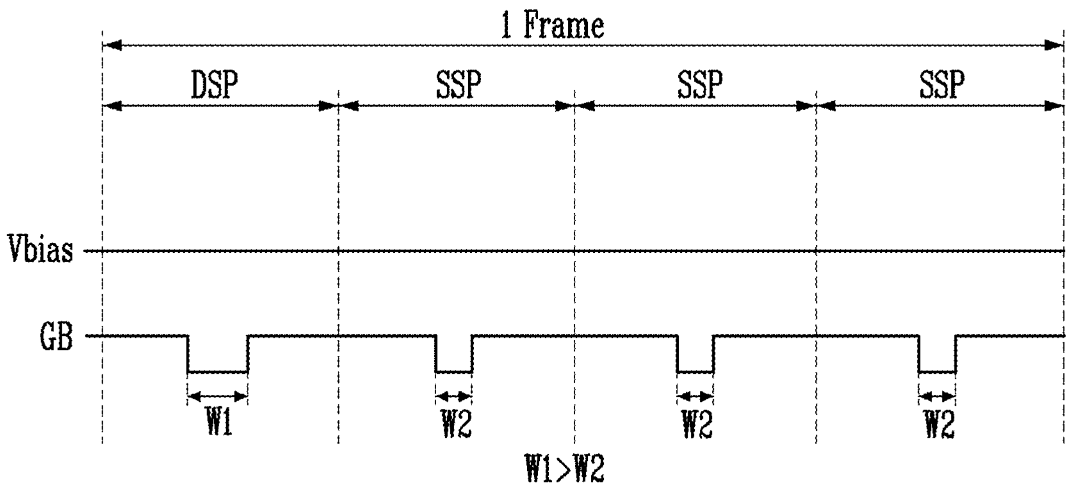
FIGS. 14 to 17 are diagrams showing a width of a bias scan signal generated by the start signal generator of FIG. 13.

The start signal generator 122 may determine the number of self-scan periods SSP in one frame period based on the driving frequency information FI. As shown in FIG. 14, the start signal generator 122 may generate the scan start signal FLM4, and supply the generated scan start signal FLM4 to the scan driver 130. The bias scan signal GB may have different widths during the display-scan period DSP and the self-scan period SSP depending on width of the scan start signal FLM4.

The scan driver 130 may provide the bias scan signal GB having a first width W1 to the pixel circuit during the display-scan period DSP, and provide the bias scan signal GB having a second width W2 to the pixel circuit during the self-scan period SSP. Because the width of the bias scan signal GB is set differently between during the display-scan period DSP and during the self-scan period SSP, a time period during which the bias power source Vbias is supplied may be set differently. For example, when the first width W1 is greater than the second width W2, an on-bias period of the first transistor M1 may be set longer during the display-scan period DSP than during the self-scan period SSP.

By adjusting the widths of the bias scan signal GB differently during the display-scan period DSP and the self-scan period SSP, the bias power source Vbias may maintain constant voltage level during one frame period. However, embodiments of the present disclosure are not limited thereto, and as shown in FIG. 6, the voltage level of the bias power source Vbias may be adjusted to have a lower voltage during the self-scan period SSP compared with the voltage level of the bias power source Vbias during the display-scan period DSP.

Referring to FIG. 14, the start signal generator 122 may generate and supply the scan start signal FLM4 to the scan driver 130, and the width of the bias scan signal GB may be changed at each stage of self-scan periods SSP.

The scan driver 130 may apply a first bias scan signal GB having a first width W1 during the display-scan period DSP, and may apply a second bias scan signal GB having a second width W2. The scan driver 130 may change the first width W1 of the first bias scan signal GB to the second width W2 of second bias scan signal GB at stages of self-scan periods SSP.

Figure 15:
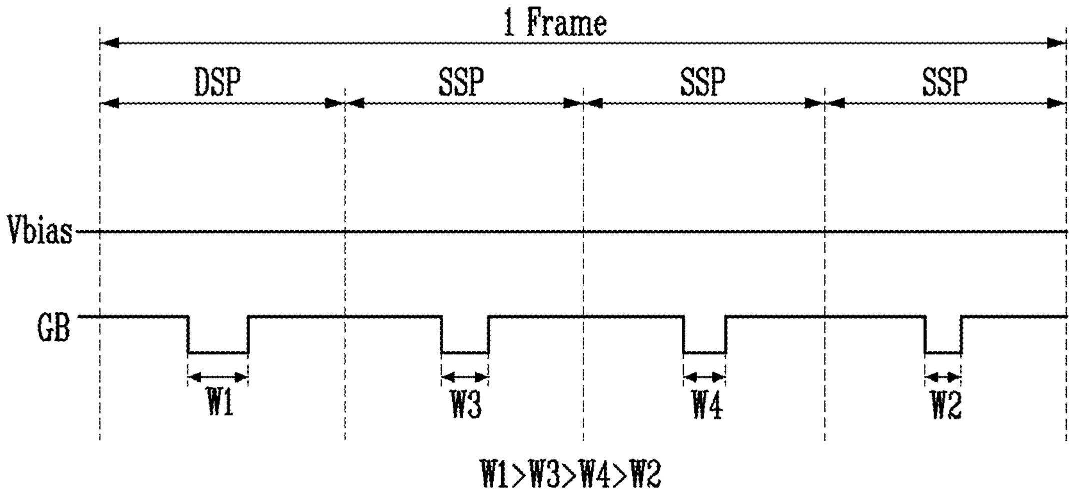

Referring FIG. 15, during a first self-scan period SSP immediately following the display-scan period DSP, the scan driver 130 may apply the bias scan signal GB having a third width W3 that is narrower than the first width W1. During a second self-scan period SSP immediately following the first self-scan period SSP, the scan driver 130 may provide the bias scan signal GB having a fourth width W4 that is narrower than the third width W3. During a third self-scan period SSP immediately following the second self-scan period SSP, the scan driver 130 may provide the bias scan signal GB having the second width W2 that is narrower than the fourth width W4.

Because the scan driver provide different widths of the bias scan signal GB during the display-scan period DSP and the self-scan period SSP, the bias power source Vbias may maintain constant voltage level for one frame period. However, embodiments of the present disclosure are not limited thereto, the voltage level of the bias power source Vbias may have a lower voltage during the self-scan period SSP compared with the voltage of the bias power source Vbias during the display-scan period DSP.

The start signal generator 122 may determine the driving frequency based on the driving frequency information FI. The start signal generator 122 may control the width of the bias scan signal GB based on the driving frequency. For example, the start signal generator 122 may decrease the width of the scan start signal FLM4 as the driving frequency increases. The first width W1 and the second width W2 shown in FIG. 14 may be decreased as the driving frequency increases.

The start signal generator 122 may determine whether the driving frequency is changed based on the driving frequency information FI. Upon determining that the driving frequency of the display device 100 is changed, the start signal generator 122 may adjust the scan start signal FLM4 to change the width of the bias scan signal GB accordingly.

Figure 16:
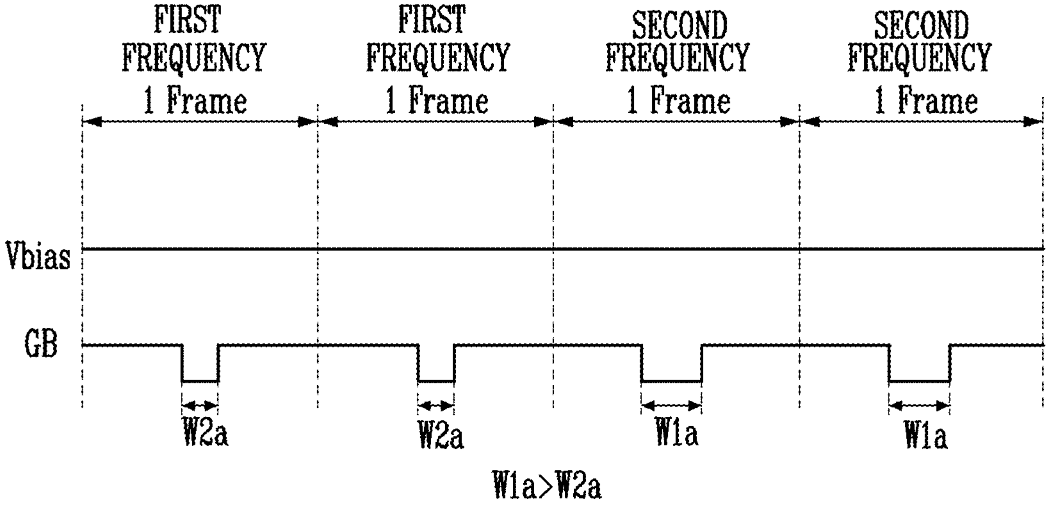

Referring to FIG. 16, the scan driver 130, based on the scan start signal FLM4, may provide a first bias scan signal GB having a second width W2*a* when the display device 100 operates at a first frequency, and provide a second bias scan signal GB having a first width W1*a* when the display device 100 operates at a second frequency. The first width W1*a* of the second bias scan signal GB may be greater than the second width W2*a* of first bias scan signal GB.

Because the scan driver 130 provides the first bias scan signal GB having a first width when the display device 100 operates at the first frequency and provides the second bias scan signal GB having a second width when the display device 100 operates at the second frequency, the bias power source Vbias may maintain stable voltage level regardless of the driving frequency. However, embodiments of the present disclosure are not limited thereto. For example, the voltage level of the bias power source Vbias may be set to be lower when the display device 100 operates at the first frequency compared with the voltage level of the bias power source Vbias when the display device 100 operates at the second frequency.

Figure 17:
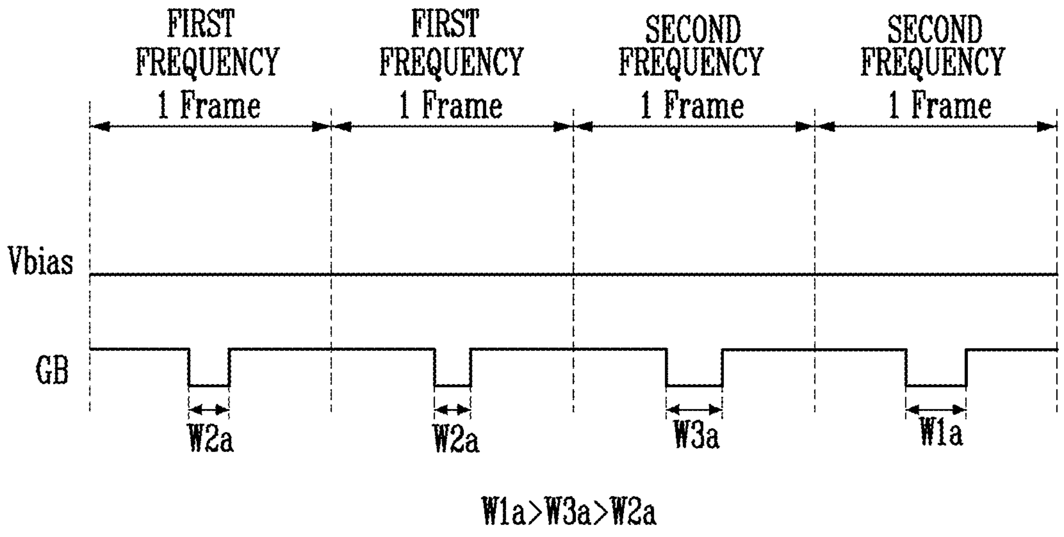

Referring to FIG. 17, when the driving frequency of the display device 100 is changed for different frames, the start signal generator 122 may adjust the scan start signal FLM4 accordingly and provide the adjusted scan start signal FLM4 to the scan driver 130, and the width of the bias scan signal GB may be changed accordingly at each stage of the frames having different driving frequencies.

The scan driver 130 may change the widths of the bias scan signal GB from the second width W2*a* to the third width W3*a* depending on the driving frequencies, and may also change the widths of the bias scan signal GB from the third width W3*a* to the first width W1*a*. For example, the scan driver 130 may provide the pixels PX with the bias scan signal GB having a second width W2*a* when the display device 100 operates at first driving frequency and provide the pixels with the bias scan signal GB having a third width W3*a* when the display device 100 operates at second driving frequency during a first frame period of the second frequency. When the first driving frequency of the display device 100 is higher than the second driving frequency, the third width W3*a* that is greater than the second width W2*a* during a first frame period of the second frequency. In addition, the scan driver 130 may provide the pixels PX with the bias scan signal GB having the first width W1*a* during a second frame period of the second frequency. The first width W1*a* during a second frame period of the second frequency may be wider than the third width W3*a* during a first frame period of the second frequency.

The widths of the bias scan signal GB may also be changed when a first driving frequency during the display-scan period and a second driving frequency during the self-scan period are different from each other. For example, the first width W1 and the second width W2 of the bias scan signal GB shown in FIG. 14 may also be changed at different stages of the display-scan period and the self-scan period. When the driving frequency of the display device 100 is changed from the first frequency to the second frequency, the scan driver 130 may set the first width W1 and the second width W2 in response to the bias scan signal GB having the third width W3*a* during the first frame period of the second frequency. In addition, the scan driver 130 may set the first width W1 and the second width W2 in response to the bias scan signal GB having the first width W1*a* during the second frame period of the second frequency. Each of the first width W1 and the second width W2 of the bias scan signal GB included in the second frame period of the second frequency may be greater than each of the first width W1 and the second width W2 of the bias scan signal GB provided during the first frame period of the second frequency.

Likewise, when the driving frequency of the display device 100 is changed from the second frequency to the first frequency, the scan driver 130 may change the width of the bias scan signal GB at frame stages having different driving frequencies from the first width W1*a* to the second width W2*a* for two or more frame periods.

Because the widths of the bias scan signal GB are differently applied to pixels PX depending on whether the display device 100 operates at the first frequency or operates at the second frequency, the voltage level of the bias power source may maintain stable voltage level regardless of the driving frequency. However, embodiments of the present disclosure are not limited thereto. For example, the voltage level of the bias power source may be lower when the display device 100 drive at the first frequency than when the display device 100 drives at the second frequency.

Figure 18:
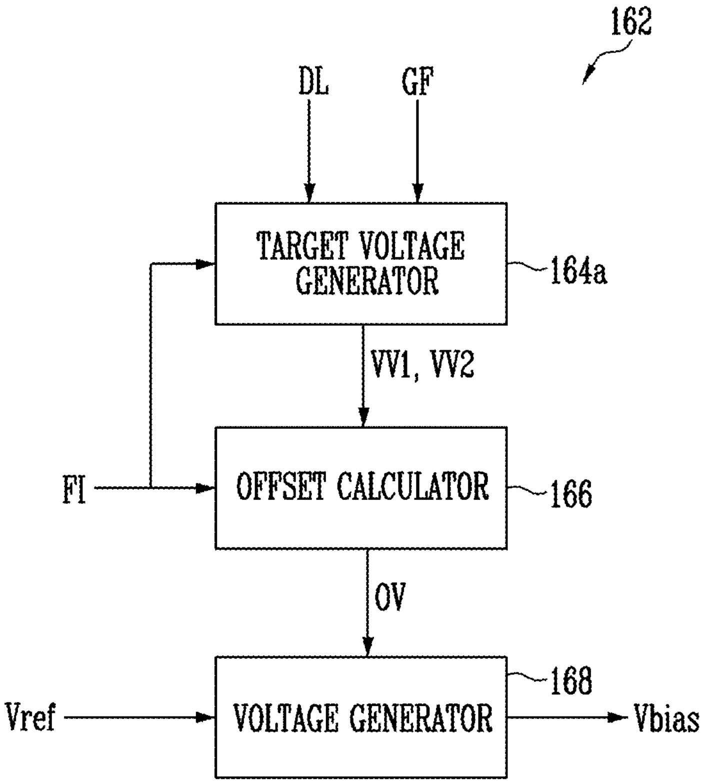
FIG. 18 is a diagram illustrating a bias voltage generator according to an embodiment.

FIG. 18 is a diagram illustrating an embodiment of the bias voltage generator 162.

Referring to FIG. 18, the bias voltage generator 162 may include a target voltage generator 164*a*, the offset calculator 166, and the voltage generator 168.

The target voltage generator 164*a* may generate the first voltage value VV1 and the second voltage value VV2 based on the driving frequency information FI. In addition, the target voltage generator 164*a* may receive dimming level information DL or average grayscale information GF of one frame and change the first voltage value VV1 and the second voltage value VV2 based on at least one of the dimming level information DL or average grayscale information GF.

A dimming level may refer to a maximum luminance at which the display device 100 can emit light. For example, as the dimming level increases, the maximum display luminance that can be displayed by the pixel portion 110 may increase. The maximum display luminance may be a luminance measured when the entire pixel portion 110 emits light with the maximum grayscale that is set by the display device 100. The target voltage generator 164*a* may decrease the first voltage value VV1 and/or the second voltage value VV2 in proportion to the increase of the dimming level indicated by the dimming level information DL.

The target voltage generator 164*a* may control the first voltage value VV1 and/or the second voltage value VV2 in response to the average grayscale included in the average grayscale information GF of one frame. For example, the target voltage generator 164*a* may decrease the first voltage value VV1 and/or the second voltage value VV2 as the average grayscale increases.

Figure 19:
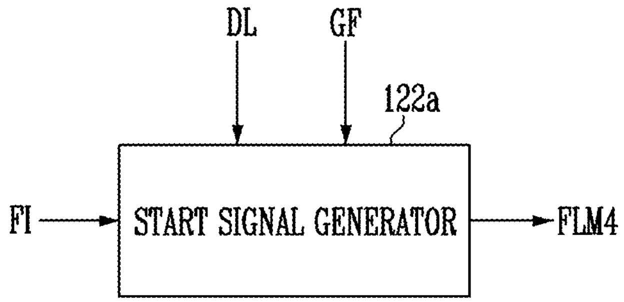
FIG. 19 is a diagram illustrating a start signal generator according to an embodiment.

FIG. 19 is a diagram illustrating a start signal generator 122*a* according to an embodiment Referring to FIG. 19, the start signal generator 122*a* may control the width of the scan start signal FLM4 based on the driving frequency information FI. By changing the width of the scan start signal FLM4, the width of the bias scan signal GB may also be changed. The scan driver 130 may adjust the width of the bias scan signal GB based on the width of the scan start signal FLM4.

Additionally, the start signal generator 122*a* may change the width of the scan start signal FLM4 by using at least one of the dimming level information DL or the average grayscale information GF of one frame.

The start signal generator 122*a* may adjust the width of the scan start signal FLM4 to change the width of the bias scan signal GB. The width of the scan start signal FLM4 and the width of the bias scan signal GB may be decreased as the dimming level of the dimming level information DL increases. The scan driver 130 may generate the bias scan signal GB having a width inversely proportional to the dimming level based on the scan start signal FLM4.

The start signal generator 122*a* may control the scan start signal FLM4 in accordance with an average grayscale included in the average grayscale information GF of one frame. For example, the start signal generator 122*a* may control the width of the scan start signal FLM4 to change the width of the bias scan signal GB. The width of the bias scan signal GB may be decreased as the average grayscale increases. The scan driver 130 may generate the bias scan signal GB having a width inversely proportional to the average grayscale based on the scan start signal FLM4.

Figure 20:
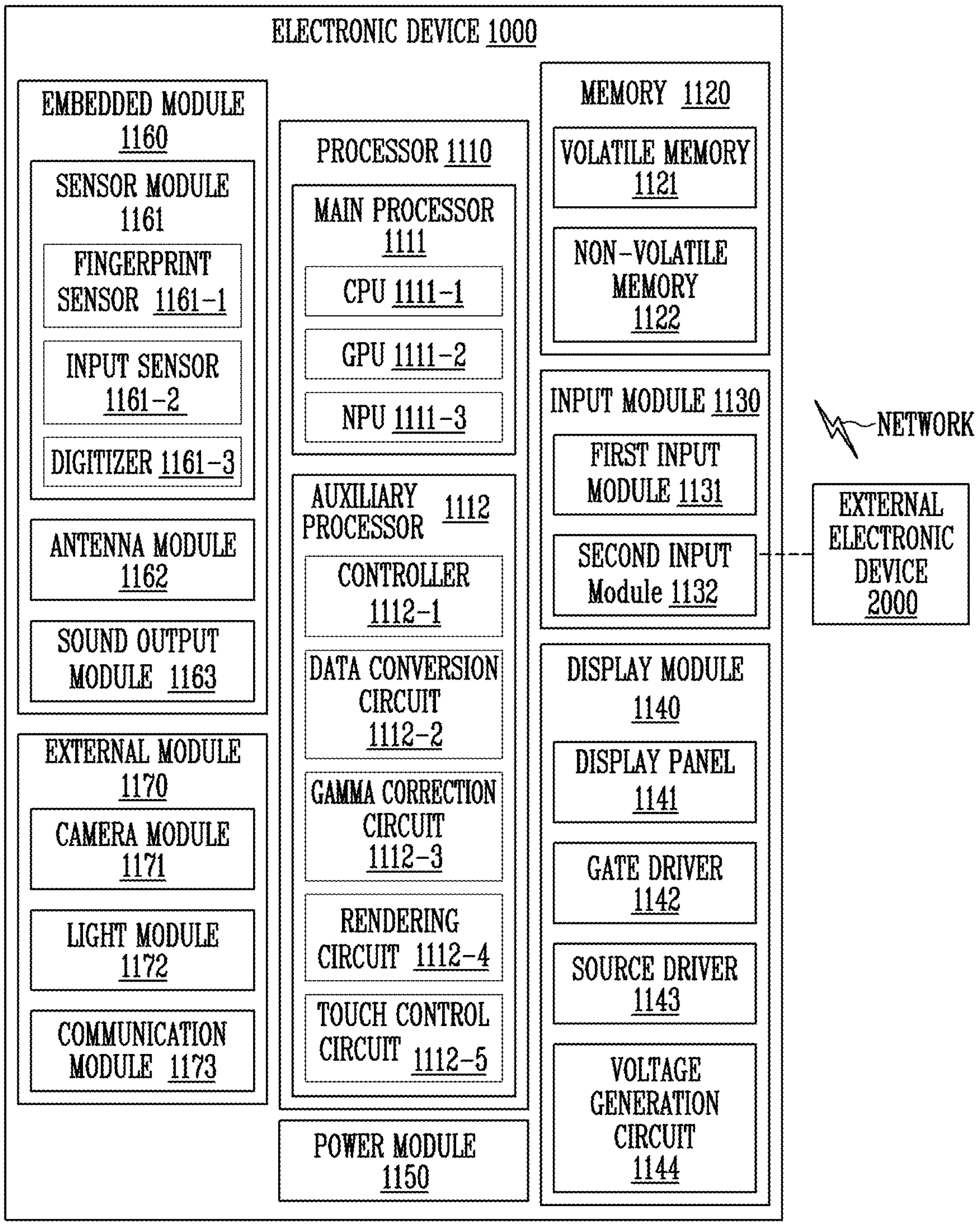
FIG. 20 is a diagram illustrating an electronic device according to an embodiment of the present disclosure.

FIG. 20 is a diagram illustrating an electronic device 1000 according to an embodiment.

Referring to FIG. 20, the electronic device 1000 displays various information through a display module 1140. When a processor 1110 executes an application stored in a memory 1120, the display module 1140 provides application information to a user through a display panel 1141.

The processor 1110 receives input through an input module 1130 or a sensor module 1161 from external devices, and executes an application corresponding to the received input. For example, when the user selects a camera icon or a camera application icon displayed on the display panel 1141, the processor 1110 receives the user input through an input sensor 1161-2 and activates a camera module 1171. The processor 1110 transmits image data corresponding to a captured image acquired through the camera module 1171 to the display module 1140. The display module 1140 may display an image corresponding to the captured image through the display panel 1141.

The electronic device 1000 may also execute a personal information authentication in the display module 1140. For example, fingerprint sensor 1161-1 acquires fingerprint information as input data. The processor 1110 compares the input data acquired through the fingerprint sensor 1161-1 with the authentication data stored in the memory 1120, and executes an application according to the comparison result. The display module 1140 may display information executed according to the logic of the application through the display panel 1141. The fingerprint sensor 1161-1 may be arranged to acquire fingerprint information in the entire area of the display module 1140 (or the display panel 1141).

The electronic device 1000 may also execute music streaming when a music streaming icon displayed on the display module 1140 is selected. The processor 1110 acquires the user input through the input sensor 1161-2 and activates a music streaming application stored in the memory 1120. When a music play command is input to the music streaming application, the processor 1110 activates a sound output module 1163 to provide sound information corresponding to the music play command to the user.

The electronic device 1000 may include various components for performing operations explained above. Some components of the electronic device 1000 may be integrated into one component.

The electronic device 1000 may communicate with an external electronic device 2000 through a network such as near field communication network or a far field communication network. According to an embodiment, the electronic device 1000 may include the processor 1110, the memory 1120, the input module 1130, the display module 1140, a power module 1150, an embedded module 1160, and an external module 1170. Some components of the electronic device 1000 may be optional, while other components not listed above may be adopted. Some components such as the sensor module 1161, an antenna module 1162, or the sound output module 1163 may be integrated into other component such as the display module 1140.

The processor 1110 may execute software to control at least one other hardware or software components of the electronic device 1000, and may perform various data processing operations on the hardware or software components. At least a portion of the data processing operations include storing commands or data received from another component such as the input module 1130, the sensor module 1161, or a communication module 1173 in a volatile memory 1121, and processing the commands or data stored in the volatile memory 1121 and storing the processing result in a non-volatile memory 1122.

The processor 1110 may include a main processor 1111 and an auxiliary processor 1112. The main processor 1111 may include a central processing unit (CPU) 1111-1. The main processor 1111 may further include one or more of a graphic processing unit (GPU) 1111-2, a communication processor (CP), or an image signal processor (ISP). The main processor 1111 may further include a neural processing unit (NPU) 1111-3. The NPU 1111-3 is a processor specialized in processing an artificial intelligence model, and the artificial intelligence model may be generated through machine learning. The artificial intelligence model may include a plurality of artificial neural network layers. An artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, or a combination of two or more of the above, but is not limited to the example. The artificial intelligence model may include a software structure in addition to a hardware structure. Two or more of the processing units or processors may be implemented in one integrated component, or each may be implemented in an independent component. A single chip may include the processing units integrated into one component, and a plurality of chips may include the processing units implemented in several independent components.

The auxiliary processor 1112 may include a controller 1112-1. The controller 1112-1 may include an interface conversion circuit and a timing control circuit. For example, the auxiliary processor 1112 may include the timing controller 120 shown in FIG. 1. When the auxiliary processor 1112 includes the timing controller 120 shown in FIG. 1, the auxiliary processor 1112 may include the start signal generator 122 or **122*a* shown in FIG. 13 or 19. At least some functions or configurations of the timing controller 120 may be included in the controller 1112-1, a data conversion circuit 1112-2, a gamma correction circuit 1112-3, a rendering circuit 1112-4**, and the like.

The controller 1112-1 receives an image signal from the main processor 1111, converts a data format of the image signal in compliance with an interface specification of the display module 1140, and outputs the image data. The controller 1112-1 may output various control signals required for driving the display module 1140.

The auxiliary processor 1112 may further include the data conversion circuit 1112-2, the gamma correction circuit 1112-3, the rendering circuit 1112-4, a touch control circuit 1112-5, and the like. The data conversion circuit 1112-2 may receive image data from the controller 1112-1, and compensate for the image data so that an image is displayed at desired luminance according to the characteristics of the electronic device 1000 or the user's settings, or convert the image data to reduce power consumption or to compensate the image data for afterimages.

The gamma correction circuit 1112-3 may convert image data, a gamma reference voltage, or the like so that an image displayed on the electronic device 1000 has a desired gamma characteristic. The rendering circuit 1112-4 may receive the image data from the controller 1112-1 and render the image data in consideration of pixel arrangements or the like in the display panel 1141 applied to the electronic device 1000.

The touch control circuit 1112-5 may supply a touch signal to the input sensor 1161-2 and receive a sensing signal from the input sensor 1161-2 in response to the touch signal.

At least one of the data conversion circuit 1112-2, the gamma correction circuit 1112-3, the rendering circuit 1112-4, or the touch control circuit 1112-5 may be integrated into another component such as the main processor 1111 or the controller 1112-1. At least one of the data conversion circuit 1112-2, the gamma correction circuit 1112-3, or the rendering circuit 1112-4 may be integrated into a source driver 1143.

The memory 1120 may store various data used by at least one component of the electronic device 1000 and input data or output data for commands related thereto. At least one component of the electronic device 1000 may include the processor 1110 or the sensor module 1161. In addition, various user setting may be stored in the memory 1120. The memory 1120 may include at least one of the volatile memory 1121 or the non-volatile memory 1122.

The input module 1130 may receive commands or data from external electronic device 2000 or other user interface, and provide a component of the electronic device 1000 with the received command or data. The component of the electronic device 1000 may include the processor 1110, the sensor module 1161, or the sound output module 1163.

The input module 1130 may include a first input module 1131 to which the user enters commands or data, and a second input module 1132 to which the external electronic device 2000 provides commands or data. The first input module 1131 may include a microphone, a mouse, a keyboard, a key such as a button, or a pen (e.g., a passive pen or an active pen). The second input module 1132 may support a specified protocol which may be connected wired or wireless to the external electronic device 2000. The second input module 1132 may include a high definition multimedia interface (HDMI), a universal serial bus (USB) interface, a secure digital (SD) card interface, or an audio interface. The second input module 1132 may include a connector which can be physically connected to the external electronic device 2000, for example, an HDMI connector, a USB connector, an SD card connector, or an audio connector such as a headphone connector.

The display module 1140 provides visual information to the user. The display module 1140 may include the display panel 1141, a gate driver 1142, the source driver 1143, and a voltage generation circuit 1144. The display module 1140 may include a window, a chassis, and a bracket for protecting the display panel 1141. The display module 1140 may include at least some components of the display device 100 shown in FIG. 1.

The display panel 1141 may include a liquid crystal display panel, an organic light-emitting display panel, or an inorganic light emitting display panel. A type of the display panel 1141 is not limited to examples listed above. The display panel 1141 may be of a rigid type or of a flexible type such as a rollable type or a foldable type. The display module 1140 may further include a supporter, a bracket, a heat dissipation layer, or the like supporting the display panel 1141. The display panel 1141 may include the pixel portion 110 shown in FIG. 1.

The gate driver 1142 may be mounted on the display panel 1141 as a driving chip. In addition, the gate driver 1142 may be integrated into the display panel 1141. For example, the gate driver 1142 may include an amorphous silicon TFT gate driver circuit (ASG), a low-temperature polycrystalline silicon (LTPS) TFT gate driver circuit, or an oxide semiconductor TFT gate driver circuit (OSG) embedded in the display panel 1141. The gate driver 1142 receives a control signal from the controller 1112-1 and outputs scan signals to the display panel 1141 in response to the control signal. The gate driver 1142 may include the scan driver 130 shown in FIG. 1.

The display module 1140 may further include an emission driver. The emission driver outputs an emission control signal to the display panel 1141 in response to the control signal received from the controller 1112-1. The emission driver may be formed separately from the gate driver 1142, or may be integrated into the gate driver 1142. The emission driver may include the emission driver 150 shown in FIG. 1.

The source driver 1143 receives the control signal from the controller 1112-1, converts the image data into a data signal which is an analog voltage in response to the control signal, and outputs the data signal to the display panel 1141. The source driver 1143 may include the data driver 140 shown in FIG. 1.

The source driver 1143 may be integrated into another component such as the controller 1112-1. Functions of the interface conversion circuit and the timing control circuit of the controller 1112-1 described above may be integrated into the source driver 1143. The voltage generation circuit 1144 may output various voltages required for driving the display panel 1141. For example, the voltage generation circuit 1144 may include the bias voltage generator 162 shown in FIG. 8, 9, or 18.

The source driver 1143 may convert data corresponding to a red (R) color, a green (G) color, and a blue (B) color included in the image data received from the processor 1110 into a red data signal or a red data voltage, a green data signal or a green data voltage, and a blue data signal or a blue data voltage respectively, and may provide the data signals to a plurality of pixel columns included in the display panel 1141 during one pixel-row access period.

The power module 1150 supplies power to the components of the electronic device 1000. The power module 1150 may include a battery which charges a power voltage. Examples of the battery may include a non-rechargeable primary battery, a rechargeable secondary battery, or a fuel cell. The power module 1150 may include a power management integrated circuit (PMIC). The PMIC supplies optimized power to each of the modules described above and modules to be described below. The power module 1150 may include a wireless power transmitting/receiving element electrically connected to the battery. The wireless power transmitting/receiving element may include a plurality of antenna radiators in the form of coils. At least some components of the power module 1150 and the voltage generation circuit 1144 may be integrated into one component. For example, the voltage generation circuit 1144 may be included in the power module 1150.

The electronic device 1000 may further include the embedded module 1160 and the external module 1170. The embedded module 1160 may include the sensor module 1161, the antenna module 1162, and the sound output module 1163. The external module 1170 may include the camera module 1171, a light module 1172, and the communication module 1173.

The sensor module 1161 may sense an input by the user's body or an input by the pen of the first input module 1131, and generate an electrical signal or data value corresponding to the input. The sensor module 1161 may include at least one of the fingerprint sensor 1161-1, the input sensor 1161-2, or a digitizer 1161-3.

The fingerprint sensor 1161-1 may generate a data value corresponding to the user's fingerprint.

The input sensor 1161-2 may generate a data value corresponding to coordinate information of the input by the user's body or the input by the pen. The input sensor 1161-2 generates the amount of change in capacitance due to the input as the data value. The input sensor 1161-2 may sense an input by the passive pen or transmit and receive data to and from the active pen.

The input sensor 1161-2 may measure bio-signals such as blood pressure, moisture, or body fat. For example, when the user contacts a part of the body with a sensor layer or a sensing panel for a certain period of time, based on a change in an electric field caused by the part of the body, the input sensor 1161-2 may sense a bio-signal and output information desired by the user to the display module 1140.

The digitizer 1161-3 may generate a data value corresponding to the coordinated information of the input by the pen. The digitizer 1161-3 generates the amount of electromagnetic change by the input as the data value. The digitizer 1161-3 may sense the input by the passive pen or transmit and receive data to and from the active pen.

At least one of the fingerprint sensor 1161-1, the input sensor 1161-2, or the digitizer 1161-3 may be implemented as a sensor layer formed on the display panel 1141 through a continuous process. At least one of the fingerprint sensor 1161-1, the input sensor 1161-2, or the digitizer 1161-3 may be located above the display panel 1141, and one of the fingerprint sensor 1161-1, the input sensor 1161-2, or the digitizer 1161-3, for example, the digitizer 1161-3, may be located below the display panel 1141.

Two or more of the fingerprint sensor 1161-1, the input sensor 1161-2, or the digitizer 1161-3 may be formed to be integrated into one sensing panel through the same process. When integrated into one sensing panel, the sensing panel may be located between the display panel 1141 and a window located above the display panel 1141. The sensing panel may be located on the window, and the position of the sensing panel is not particularly limited.

At least one of the fingerprint sensor 1161-1, the input sensor 1161-2, or the digitizer 1161-3 may be embedded in the display panel 1141. For example, at least one of the fingerprint sensor 1161-1, the input sensor 1161-2, or the digitizer 1161-3 may be simultaneously formed through a process of forming devices (e.g., a light emitting device, a transistor, or the like) included in the display panel 1141.

In addition, the sensor module 1161 may generate an electrical signal or data value corresponding to an internal state or an external state of the electronic device 1000. The sensor module 1161 may include, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting or receiving signals or power externally. According to an embodiment, the communication module 1173 may transmit a signal to or receive a signal from the external electronic device 2000 through an antenna suitable for a communication method. An antenna pattern of the antenna module 1162 may be integrated into one component (e.g., the display panel 1141) of the display module 1140 or the input sensor 1161-2.

The sound output module 1163 is a device for outputting a sound signal to the outside of the electronic device 1000, and may include, for example, a speaker used for general purposes such as multimedia playback or recording playback, and a receiver used exclusively for receiving phone. The receiver may be formed integrally with or separately from the speaker. A sound output pattern of the sound output module 1163 may be integrated into the display module 1140.

The camera module 1171 may capture still images and film videos. The camera module 1171 may include one or more lenses, image sensors, or image signal processors. The camera module 1171 may further include an infrared camera capable of measuring the presence or absence of the user, the position of the user, a gaze of the user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000, and communication through the established communication channel. The communication module 1173 may include one or both of a wireless communication module such as a cellular communication module, a near field communication module, or a global navigation satellite system (GNSS) communication module, and a wired communication module such as a local area network (LAN) communication module or a power line communication module. The communication module 1173 may communicate with the external electronic device 2000 via a local area network such as Bluetooth, Wi-Fi direct, or infrared data association (IrDA), or a long distance communication network such as a cellular network, the Internet, or a computer network such as a LAN or a wide area network (WAN). The various types of communication modules 1173 described above may be implemented as one chip or may be implemented as separate chips.

The input module 1130, the sensor module 1161, the camera module 1171, and the like may be utilized to control the operation of the display module 1140 in conjunction with the processor 1110.

The processor 1110 outputs commands or data to the display module 1140, the sound output module 1163, the camera module 1171, or the light module 1172 based on input data received from the input module 1130. For example, the processor 1110 may generate image data in response to input data applied through a mouse, an active pen, or the like and output the image data to the display module 1140, or may generate command data in response to the input data and output the command data to the camera module 1171 or the light module 1172. When input data is not received from the input module 1130, the processor 1110 may switch an operation mode of the electronic device 1000 to a low power mode or a sleep mode to reduce power consumed by the electronic device 1000.

The processor 1110 outputs commands or data to the display module 1140, the sound output module 1163, the camera module 1171, or the light module 1172 based on sensing data received from the sensor module 1161. For example, the processor 1110 may compare the authentication data applied by the fingerprint sensor 1161-1 with the authentication data stored in the memory 1120, and then execute an application according to the comparison result. The processor 1110 may execute a command or output corresponding image data to the display module 1140 based on the sensing data sensed by the input sensor 1161-2 or the digitizer 1161-3. When the sensor module 1161 includes a temperature sensor, the processor 1110 may receive temperature data for the measured temperature from the sensor module 1161, and further perform luminance correction or the like on the image data based on the temperature data.

The processor 1110 may receive measurement data on the presence or absence of the user, the position of the user, and the gaze of the user from the camera module 1171. The processor 1110 may further correct luminance of the image data based on the measurement data. For example, when the processor 1110 determines the presence or absence of the user through an input from the camera module 1171, the processor 1110 may output the image data of which luminance is corrected to the display module 1140 through the data conversion circuit 1112-2 or the gamma correction circuit 1112-3.

Some of the above components may be connected to each other through a communication method between peripheral devices, for example, a bus, a general purpose input/output (GPIO), a serial peripheral interface (SPI), a mobile industry processor interface (MIPI), or an ultra-path interconnect (UPI) link and may exchange signals (e.g., commands or data) with each other. The processor 1110 may communicate with the display module 1140 through a mutually agreed interface, for example, one of the above-described communication methods may be used, but communication methods are not limited thereto.

FIGS. 21 to 24 are diagrams illustrating examples of an electronic device according to various embodiments.

Figure 21:
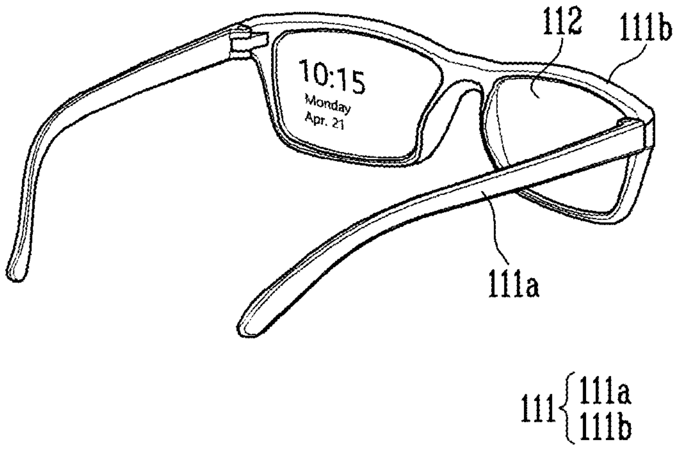
FIGS. 21 to 24 are diagrams illustrating examples of an electronic device according to embodiments.

Referring to FIG. 21, the display device 100 according to an embodiment of the present disclosure may be applied to smart glasses. The smart glasses may include a frame 111 and lens portions 112. The smart glasses may be a wearable electronic device which can be worn on the user's face, and may have a structure in which a part of the frame 111 is folded or unfolded. For example, the smart glasses may be a wearable device for augmented reality (AR).

The frame 111 may include a housing 111*b* supporting the lens portions 112 and leg portions 111*a* for wear by the user. Each of the leg portions 111*a* is connected to the housing 111*b* by a hinge and may be folded or unfolded.

A battery, a touch pad, a microphone, and/or a camera may be embedded in the frame 111. In addition, a projector that outputs light and/or a processor that controls an optical signal or the like may be embedded in the frame 111.

The lens portions 112 may be optical members that transmit or reflect light. The lens portions 112 may include glass and/or a transparent synthetic resin.

The display device 100 according to an embodiment of the present disclosure may be applied to the lens portions 112. For example, the user may recognize an image displayed by an optical signal transmitted from the projector of the frame 111 through the lens portions 112. For example, the user may recognize information, such as a time or a date, displayed on the lens portions 112.

Figure 22:
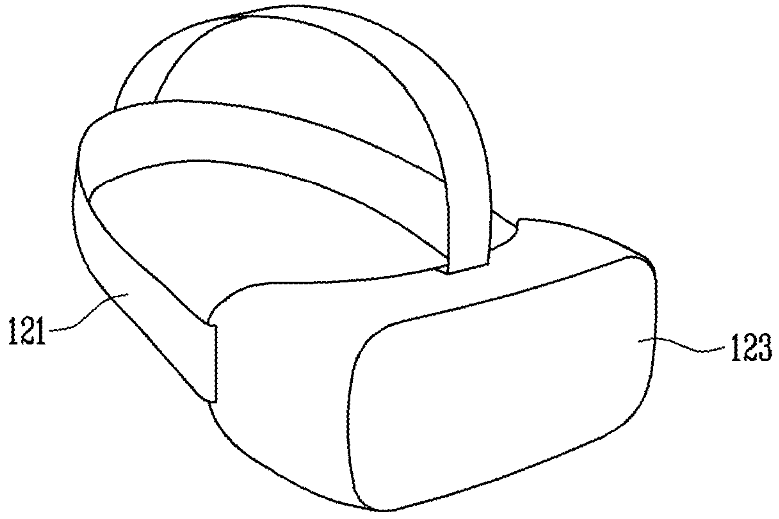

Referring to FIG. 22, the display device 100 according to an embodiment of the present disclosure may be applied to a head mounted display (HMD). The HMD may include a head-mountable band 121 and a display accommodating case 123. For example, the HMD may be a wearable electronic device that is wearable on the user's head.

The head-mountable band 121 is connected to the display accommodating case 123, so that the display accommodating case 123 can be fixed. The head-mountable band 121 may include a horizontal band and a vertical band for fixing the HMD to the user's head, the horizontal band may be provided to surround sides of the user's head, and the vertical band may be provided to surround an upper part of the user's head. However, embodiments of the present disclosure are not necessarily limited thereto, and the head-mountable band 121 may be implemented in the form of an eyeglass frame or a helmet.

The display accommodating case 123 accommodates the display device 100 and may include at least one lens. The at least one lens may provide an image to the user. For example, the display device 100 according to an embodiment of the present disclosure may be applied to a left-eye lens and a right-eye lens implemented in the display accommodating case 123.

Figure 23:
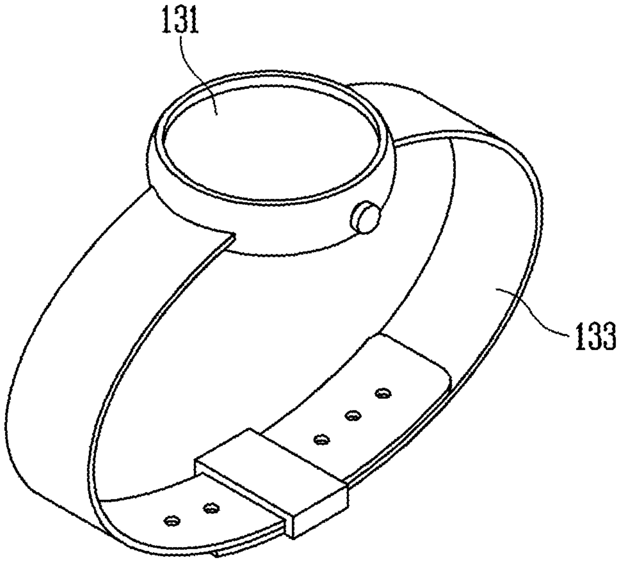

Referring to FIG. 23, the display device 100 according to an embodiment of the present disclosure may be applied to a smartwatch. The smartwatch may include a display portion 131 and a strap portion 133. The smartwatch is a wearable electronic device, and the strap portion 133 may be mounted on the user's wrist. The display device 100 according to an embodiment of the present disclosure may be applied to the display portion 131. For example, the display portion 131 may provide image data including information such as time or date.

Figure 24:
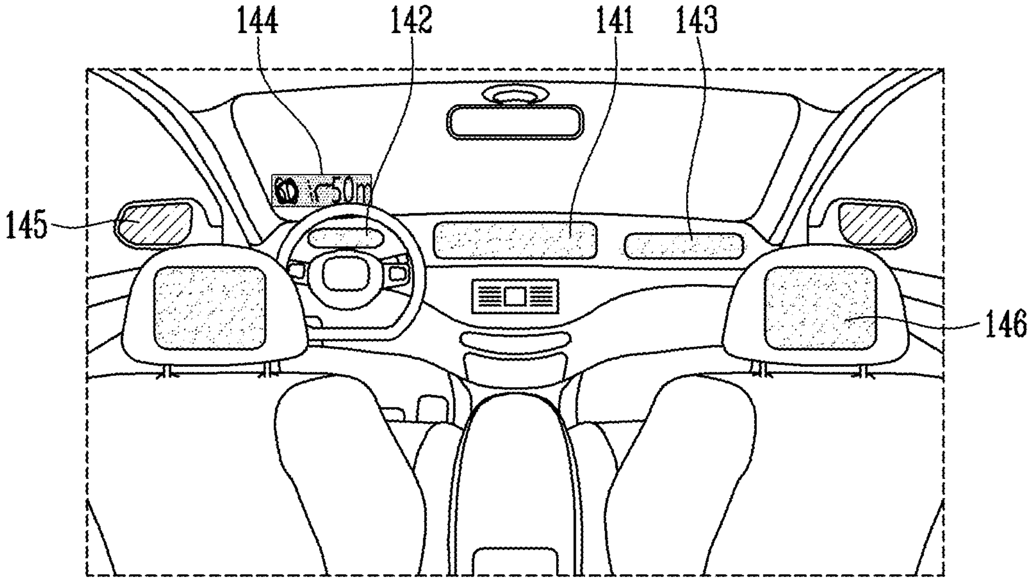

Referring to FIG. 24, the display device 100 according to an embodiment of the present disclosure may be applied to an automotive display. For example, the automotive display may refer to an electronic device provided inside and outside a vehicle to provide image data.

For example, the display device 100 according to an embodiment of the present disclosure may be applied to at least one of an infotainment panel 141, a cluster 142, a co-driver display 143, a head-up display 144, a side mirror display 145, or a rear seat display 146 provided in the vehicle.

In a display device, a driving method of the display device, and an electronic device according to embodiments of the present disclosure, a width of a bias scan signal or a voltage of a bias power source may be changed in stages during a self-scan period included in one frame, thereby improving the display quality.

In addition, according to the display device, the driving method of the display device, and the electronic device according to the embodiments of the present disclosure, when a driving frequency of the display device is changed, the width of the bias scan signal or the voltage of the bias power source may be changed in stages, thereby improving the display quality.

However, the effects of the present disclosure are not limited to the effects described above, and may be extended without departing from the spirit and scope of the present disclosure.

The present disclosure have been described above with reference to embodiments, but it will be understood to those skilled in the art that various modifications and changes are possible without departing from the spirit and scope of the present disclosure as set forth in the claims.

What is claimed is:

1. A display device comprising:

a plurality of pixels, wherein each pixel of the plurality of pixels includes;

a driving transistor, in which a gate electrode of the driving transistor is electrically connected to a first node, a first electrode of the driving transistor is electrically connected to a bias power line and receives a bias power source through the bias power line, and a second electrode of the driving transistor is electrically connected to an anode electrode of a light emitting device and drives a driving current to the light emitting device, wherein the driving transistor is configured to control an amount of the driving current in response to a voltage of the first node, the voltage of the first node corresponding to a data signal applied to the pixel from a data line, wherein the light emitting device emits light in proportion to the amount of the driving current from the driving transistor;

a bias transistor which is turned on in response to a bias scan signal and supplies the bias power source to the first electrode of the driving transistor; and a scan driver generating the bias scan signal and providing the bias scan signal to the bias transistor, wherein a frame includes a display-scan period during which the plurality of pixels receive the data signal and display an image based on the received data signal and a self-scan period during which the plurality of pixels display the image based on a stored data signal received during the display-scan period, in which the bias scan signal has a first width at a level that turns on the bias transistor during the display-scan period and has a second width at a level that turns on the bias transistor during the self-scan period, and the second width is different from the first width.

2. The display device according to claim 1, wherein the second width is narrower than the first width.

3. The display device according to claim 2, wherein the stored data signal is received previously during the display-scan period and stored in the plurality of pixels during the self-scan period.

4. The display device according to claim 3, wherein the one frame period includes two or more self-scan periods, and the scan driver adjusts a width of the bias scan signal from the first width to the second width during the two or more self-scan periods.

5. The display device according to claim 4, wherein the display device further comprises a timing controller which includes a start signal generator, and the start signal generator is configured to generate a scan start signal and provide the scan start signal to the scan driver for controlling the width of the bias scan signal.

6. The display device according to claim 5, wherein the start signal generator is configured to receive driving frequency information and determine a number of the self-scan periods included in the one frame period based on the driving frequency information.

7. The display device according to claim 6, wherein the scan start signal is configured to control the width of the bias scan signal based on a driving frequency, a dimming level, and an average grayscale of the one frame period.

8. The display device according to claim 7, wherein the scan start signal is configured to control the width of the bias scan signal to be decreased as the driving frequency increases.

9. The display device according to claim 7, wherein the scan start signal is configured to control the width of the bias scan signal to be decreased as the dimming level increases.

10. The display device according to claim 7, wherein the scan start signal is configured to control the width of the bias scan signal to be decreased as the average grayscale increases.

11. The display device according to claim 1, further comprising a bias voltage generator generating the bias power source, wherein the bias voltage generator is configured to supply the bias power source through the bias power line, and the bias power source maintains a constant voltage level during one frame period.

12. The display device according to claim 1, further comprising a bias voltage generator generating the bias power source, wherein the bias voltage generator is configured to supply the bias power source having a first voltage level to the bias power line during the display-scan period and supply the bias power source having a second voltage level to the bias power line during the self-scan period, and the second voltage level is lower than the first voltage level.

13. A display device comprising:

a plurality of pixels, each pixel of the plurality of pixels including a driving transistor and a bias transistor, wherein the bias transistor is connected between a first electrode of the driving transistor and a bias power line, and upon receiving a bias scan signal, the bias transistor is turned on and supplies a bias power source to first electrode of the driving transistor; and a bias voltage generator configured to change a voltage of the bias power source in accordance with at least one of a dimming level, an average grayscale of one frame period, or a driving frequency, wherein one frame period includes a display-scan period and a plurality of self-scan periods, and during the display-scan period, pixels receive a data signal and display an image based on the received data signal, and during the self-scan periods, pixels display the image based on a stored data signal received during the display-scan period, and wherein the bias voltage generator controls the voltage level of the bias power source during the plurality of self-scan periods to be lower than the voltage level of the bias power source during the display-scan period.

14. The display device according to claim 13, wherein the bias voltage generator is configured to control the voltage level of the bias power source to be lower as the driving frequency increases.

15. The display device according to claim 13, wherein the bias voltage generator is configured to control the voltage level of the bias power source to be lower as the dimming level increases.

16. The display device according to claim 13, wherein the bias voltage generator is configured to control the voltage level of the bias power source to be lower as the average grayscale of the one frame increases.

17. The display device according to claim 13, wherein, during the display-scan period, the plurality of pixels receive a data signal and display an image based on the received data signal, and during the self-scan period, the plurality of pixels display the image based on a stored data signal received during the display-scan period.

18. The display device according to claim 17, wherein the display device further comprises a scan driver, and the scan driver is configured to adjust a width of the bias scan signal during two or more self-scan periods of the one frame period.

19. The display device according to claim 18, wherein the display device further comprises a timing controller which includes a start signal generator, and the start signal generator is configured to generate a scan start signal and provides the scan start signal to the scan driver for controlling the width of the bias scan signal.

20. An electronic device comprising:

a processor; and a display device comprising, a plurality of pixels, each pixel of the plurality of pixels including a driving transistor and a bias transistor, wherein the bias transistor is connected between a first electrode of the driving transistor and a bias power line, and upon receiving a bias scan signal, the bias transistor is turned on and supplies a bias power source to first electrode of the driving transistor, and a gate driver supplying the bias scan signal having a first width during a display-scan period and a second width different from the first width during a self-scan period, wherein one frame period includes a display-scan period and a self-scan period, and during the display-scan period, pixels receive a data signal and display an image based on the received data signal, and during the self-scan period, pixels display the image based on a stored data signal received during the display-scan period, and wherein the processor transmits a command to the display device for controlling the gate driver of the display device to supply the bias scan signal having different widths during the display-scan period and the self-scan period.

* * * * *